US012624987B2

(12) United States Patent
 Deng et al.

(10) Patent No.: US 12,624,987 B2
(45) Date of Patent: May 12, 2026

(54) VIBRATION SENSORS

(71) Applicant: SHENZHEN SHOKZ CO., LTD.,
 Guangdong (CN)

(72) Inventors: Wenjun Deng, Shenzhen (CN);
 Yongshuai Yuan, Shenzhen (CN);
 Wenbing Zhou, Shenzhen (CN); **Yujia
 Huang**, Shenzhen (CN)

(73) Assignee: SHENZHEN SHOKZ CO., LTD.,
 Shenzhen (CN)

( * ) Notice: Subject to any disclaimer, the term of this
 patent is extended or adjusted under 35
 U.S.C. 154(b) by 373 days.

(21) Appl. No.: 18/353,101

(22) Filed: Jul. 16, 2023

(65) Prior Publication Data

US 2023/0358600 A1 Nov. 9, 2023

Related U.S. Application Data

(63) Continuation of application No.
 PCT/CN2022/097874, filed on Jun. 9, 2022.

(30) Foreign Application Priority Data

Jun. 18, 2021 (CN) .......................... 202110677119.2

(51) Int. Cl.
 *G01H 11/06* (2006.01)
 *H04R 1/10* (2026.01)
 *H04R 1/28* (2006.01)

(52) U.S. Cl.
 CPC ............... *G01H 11/06* (2013.01); *H04R 1/10*
 (2013.01); *H04R 1/2807* (2013.01); *H04R
 2460/13* (2013.01)

(58) Field of Classification Search
 CPC ...... G01H 11/06; H04R 1/2807; H04R 1/283;
 H04R 1/326; H04R 1/46; H04R 1/083;
 H04R 1/10
 See application file for complete search history.

(56) References Cited

U.S. PATENT DOCUMENTS 5,128,905 A * 7/1992 Arnott ................... B06B 1/0688
 310/334
2018/0058915 A1 3/2018 Mögelin et al.
 (Continued)

FOREIGN PATENT DOCUMENTS

CN 1589064 A 3/2005
CN 209314103 U 8/2019
 (Continued)

OTHER PUBLICATIONS

International Search Report in PCT/CN2022/097874 mailed on
Aug. 11, 2022, 6 pages.
 (Continued)

*Primary Examiner* — Paul M. West
(74) *Attorney, Agent, or Firm* — METIS IP LLC

(57) ABSTRACT

One or more embodiments of the present disclosure provide
a vibration sensor. The vibration sensor may include a
housing structure, an acoustic transducer, and a vibration
unit. The acoustic transducer may be physically connected to
the housing structure. An acoustic cavity may be formed at
least partially by the housing structure and the acoustic
transducer. The vibration unit may be configured to divide
the acoustic cavity into a plurality of acoustic cavities. The
plurality of acoustic cavities may include a first acoustic
cavity. The first acoustic cavity may be in acoustic commu-
nication with the acoustic transducer. The vibration unit may
include an elastic element and a mass element. The elastic
element and the mass element may be located in the acoustic
cavity, and the mass element may be connected to the
housing structure or the acoustic transducer through the
elastic element.

19 Claims, 22 Drawing Sheets

900A

(56)          References Cited

U.S. PATENT DOCUMENTS

2020/0322732  A1     10/2020  Lee et al.
2024/0373160  A1*   11/2024  Sugata ................. H04R 1/2811

FOREIGN PATENT DOCUMENTS

CN        110567572  A     12/2019
CN        211930820  U     11/2020
CN        212572961  U      2/2021
CN        212785847  U      3/2021
CN        213186548  U      5/2021
CN        113286213  A      8/2021

OTHER PUBLICATIONS

First Office Action in Chinese Application No. 202280007750.4
mailed on Nov. 19, 2025, 22 pages.

* cited by examiner

<u>300</u>

First direction

Second direction

400

400

420

421        422

First direction

Second direction

600

620
622          621
6221    6222

610

670

640          660          630

First direction

Second direction

<u>700</u>

800

810

8321

850

831
832
} 830

840

8322

811     820

First direction

Second direction

900A

900B

First direction

Second direction

900C

First direction

Second direction

Total surface displacement （mm）

Characteristic frequency=1678.3 Hz

Total surface displacement （mm）

Characteristic frequency =2372.2 Hz (a)                                              (b)

(a)                                                                  (b)

1400A

1400B

First direction

Second direction

Figure 15:
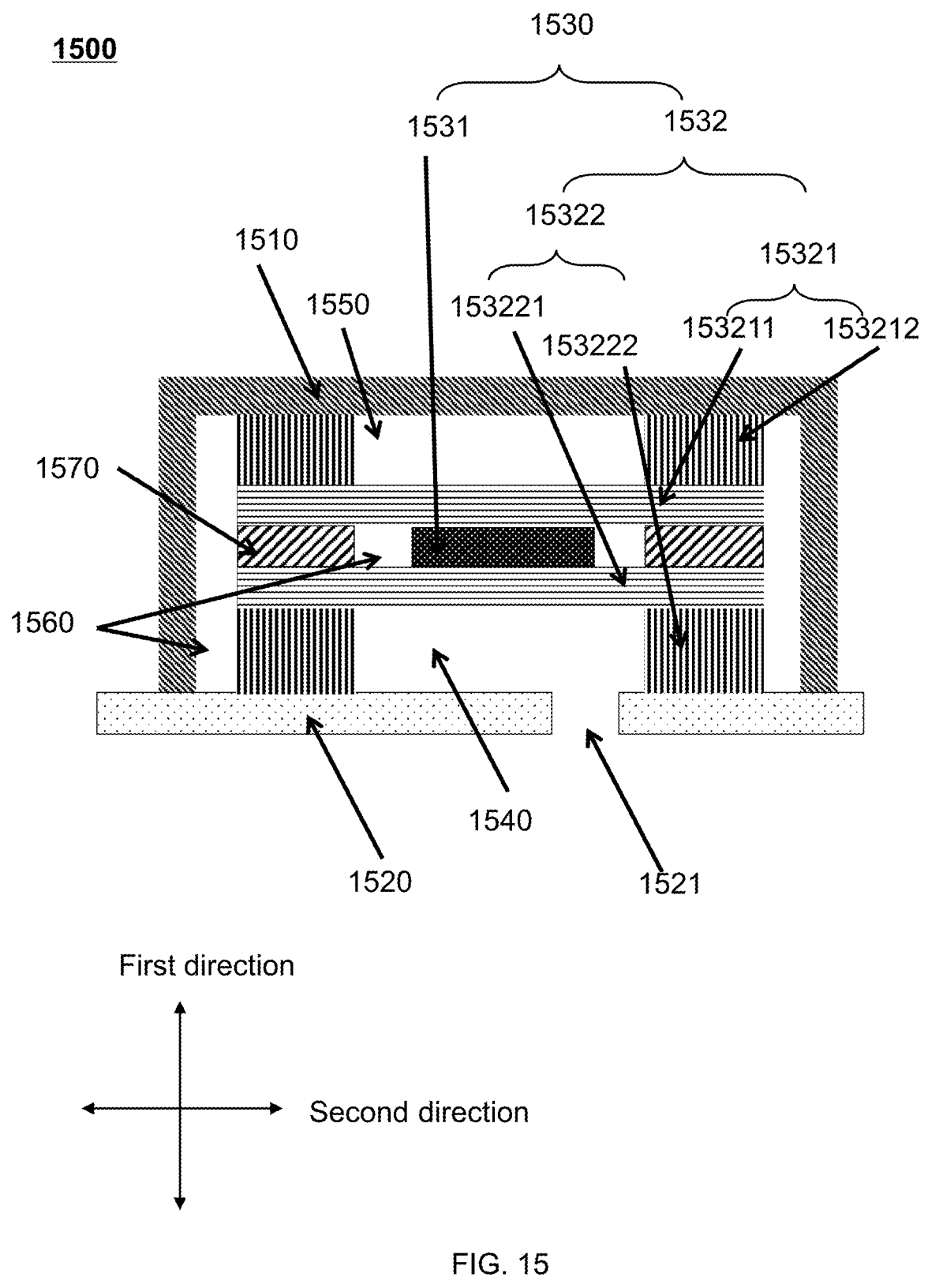

1500

1530

1531 1532

15322

1510 15321

1550 153221

153222 153211 153212

1570

1560

1540

1520 1521

First direction

Second direction

VIBRATION SENSORS

CROSS-REFERENCE TO RELATED APPLICATIONS

This application is a continuation of International Application No. PCT/CN2022/097874, filed on Jun. 9, 2022, which claims priority of the Chinese Patent Application No. 202110677119.2, filed on Jun. 18, 2021, the contents of each of which are hereby incorporated by reference.

TECHNICAL FIELD

The embodiments of the present disclosure relate to the field of sensors, and in particular to vibration sensors.

BACKGROUND

A vibration sensor is an energy conversion device that converts vibration signals into electrical signals. In some cases, the vibration sensor can be used as a bone conduction microphone. In the bone conduction microphone, the vibration sensor can detect the vibration signals transmitted through the skin when a person speaks, and convert the vibration signals transmitted by the human skin into the electrical signals, thereby achieving the sound transmission. The bone conduction microphone can reduce the interference of the airborne noise in the external environment on a target sound source, thereby improving the effect of the sound transmission. The vibration sensor (e.g., the bone conduction microphone) can receive vibration signals (e.g., vibration signals of the vibration loudspeaker of the earphone, vibration signals of the earphone, etc.) other than the target sound source in actual application scenarios, thus reducing the effect of the sound transmission of the vibration sensor.

Therefore, it is desirable to provide a vibration sensor capable of reducing the influence of non-target vibration signals, thereby improving the effect of the sound transmission of the vibration sensor on the target vibration signals.

SUMMARY

One or more embodiments of the present disclosure provide a vibration sensor. The vibration sensor may include a housing structure, an acoustic transducer, and a vibration unit. The acoustic transducer may be physically connected to the housing structure. An acoustic cavity may be formed at least partially by the housing structure and the acoustic transducer. The vibration unit may be configured to divide the acoustic cavity into a plurality of acoustic cavities. The plurality of acoustic cavities may include a first acoustic cavity. The first acoustic cavity may be in acoustic communication with the acoustic transducer. The vibration unit may include an elastic element and a mass element. The elastic element and the mass element may be located in the acoustic cavity, and the mass element may be connected to the housing structure or the acoustic transducer through the elastic element. The housing structure may be configured to generate vibrations in a first direction and a second direction based on an external vibration signal, the vibration unit may cause a volume change of the first acoustic cavity in response to the vibrations of the housing structure, and the acoustic transducer may generate an electrical signal based on the volume change of the first acoustic cavity. The elastic element may include a first elastic element and a second elastic element. The first elastic element and the second elastic element may be respectively connected to the mass element and distributed at intervals along a vibration direction of the vibration unit. The vibration direction may include a first direction and a second direction.

In some embodiments, a response sensitivity of the vibration unit to the vibrations of the housing structure in the first direction may be higher than the response sensitivity of the vibration unit to the vibrations of the housing structure in the second direction within a target frequency range. The second direction may be perpendicular to the first direction.

In some embodiments, a ratio of a resonant frequency of vibrations of the vibration unit in the second direction to a resonant frequency of vibrations of the vibration unit in the first direction may be larger than or equal to 2.

In some embodiments, a difference between a response sensitivity of the vibration unit to the vibrations of the housing structure in the second direction and a response sensitivity of the vibration unit to the vibrations of the housing structure in the first direction may be within a range of −20 dB to 40 dB.

In some embodiments, the first direction may be a thickness direction of the mass element, and a distance between a centroid of the elastic element and a center of gravity of the mass element in the first direction may be not larger than $\frac{1}{3}$ of a thickness of the mass element.

In some embodiments, a distance between the centroid of the elastic element and the center of gravity of the mass element in the second direction may be not larger than $\frac{1}{3}$ of a side length or a radius of the mass element.

In some embodiments, the first elastic element and the second elastic element may be connected to the housing structure or the acoustic transducer corresponding to the acoustic cavity. The first elastic element and the second elastic element may be approximately symmetrically distributed in the first direction with respect to the mass element, wherein the first direction is a thickness direction of the mass element, an upper surface of the mass element is connected to the first elastic element, and a lower surface of the mass element is connected to the second elastic element.

In some embodiments, sizes, shapes, materials, and thicknesses of the first elastic element and the second elastic element may be the same.

In some embodiments, the first elastic element and the second elastic element may be film structures. One side of the first elastic element may be connected to the upper surface of the mass element, one side of the second elastic element may be connected to the lower surface of the mass element, and a size of the upper surface or the lower surface of the mass element may be less than sizes of the first elastic element and the second elastic element.

In some embodiments, a volume of an acoustic cavity formed between the first elastic element and the housing structure or the acoustic transducer corresponding to the acoustic cavity may be larger than or equal to a volume of the first acoustic cavity formed between the second elastic element and the housing structure or the acoustic transducer corresponding to the acoustic cavity.

In some embodiments, the first elastic element and the second elastic element may be located between a peripheral side of the mass element and the housing structure, and the peripheral side of the mass element may be connected to the housing structure through the first elastic element and the second elastic element.

In some embodiments, a volume of an acoustic cavity formed between the first elastic element, the mass element, and the housing structure or the acoustic transducer corresponding to the acoustic cavity may be larger than or equal to a volume of the first acoustic cavity formed between the second elastic element, the mass element, and the housing structure or the acoustic transducer corresponding to the acoustic cavity.

In some embodiments, a gap may be arranged between the first elastic element, the second elastic element, the mass element, and the housing or the acoustic transducer corresponding to the acoustic cavity, and the gap may have a filler for adjusting a quality factor of the vibration sensor.

In some embodiments, a thickness of the mass element may be within a range of 10 μm to 1000 μm, and a thickness of each of the first elastic element and the second elastic element may be within a range of 0.1 μm to 500 μm.

In some embodiments, the first elastic element and the second elastic element may be columnar structures, and the first elastic element and the second elastic element may respectively extend along the thickness direction of the mass element and are connected to the housing structure or the acoustic transducer.

In some embodiments, a gap may be arranged between an outer side of the first elastic element, an outer side of the second elastic element, an outer side of the mass element, and the housing structure or the acoustic transducer corresponding to the acoustic cavity, and the gap may have a filler for adjusting a quality factor of the vibration sensor.

In some embodiments, the first elastic element may include a first sub-elastic element and a second sub-elastic element. The first sub-elastic element may be connected to the housing structure or the acoustic transducer corresponding to the acoustic cavity through the second sub-elastic element, and the first sub-elastic element may be connected to the upper surface of the mass element. The second elastic element may include a third sub-elastic element and a fourth sub-elastic element. The third sub-elastic element may be connected to the housing structure or the acoustic transducer corresponding to the acoustic cavity through the fourth sub-elastic element, and the third sub-elastic element may be connected to the lower surface of the mass element.

In some embodiments, a peripheral side of the first sub-elastic element may approximately coincide with a peripheral side of the second sub-elastic element, and a peripheral side of the third sub-elastic element may approximately coincide with a peripheral side of the fourth sub-elastic element.

In some embodiments, the vibration sensor may further include a fixing piece. The fixing piece may be distributed along the peripheral side of the mass element, the fixing piece may be located between the first sub-elastic element and the third sub-elastic element, and an upper surface and a lower surface of the fixing piece may be respectively connected to the first sub-elastic element and the third sub-elastic element.

In some embodiments, a gap may be arranged between the fixing piece, the mass element, the first sub-elastic element, and the second sub-elastic element, and the gap may have a filler for adjusting a quality factor of the vibration sensor.

One or more embodiments of the present disclosure provide a vibration sensor. The vibration sensor may include a housing structure, an acoustic transducer, and a vibration unit. The acoustic transducer may be physically connected to the housing structure. An acoustic cavity may be formed at least partially by the housing structure and the acoustic transducer. The vibration unit may be configured to divide the acoustic cavity into a plurality of acoustic cavities. The plurality of acoustic cavities may include a first acoustic cavity. The first acoustic cavity may be in acoustic communication with the acoustic transducer. The vibration unit may include an elastic element and a mass element. The elastic element and the mass element may be located in the acoustic cavity, and the mass element may be connected to the housing structure or the acoustic transducer through the elastic element. The housing structure may be configured to generate vibrations based on an external vibration signal, the vibration unit may cause a volume change of the first acoustic cavity in response to the vibrations of the housing structure, and the acoustic transducer may generate an electrical signal based on the volume change of the first acoustic cavity. The mass element may be distributed on two opposite sides of the elastic element in a first direction.

In some embodiments, a response sensitivity of the vibration unit to the vibrations of the housing structure in the first direction may be higher than the response sensitivity of the vibration unit to the vibrations of the housing structure in the second direction within a target frequency range. The second direction may be perpendicular to the first direction.

In some embodiments, a ratio of a resonant frequency of vibrations of the vibration unit in the second direction to a resonant frequency of vibrations of the vibration unit in the first direction may be larger than or equal to 2.

In some embodiments, a difference between a response sensitivity of the vibration unit to the vibrations of the housing structure in the second direction and a response sensitivity of the vibration unit to the vibrations of the housing structure in the first direction may be within a range of −20 dB to 40 dB.

In some embodiments, a distance between a centroid of the elastic element and a center of gravity of the mass element in the first direction may be not larger than ⅓ of a thickness of the mass element.

In some embodiments, a distance between the centroid of the elastic element and the center of gravity of the mass element in the second direction may be not larger than ⅓ of a side length or a radius of the mass element.

In some embodiments, the mass element may include a first mass element and a mass elastic element. The first mass element and the second mass element may be symmetrically disposed in the first direction with respect to the mass element.

BRIEF DESCRIPTION OF THE DRAWINGS

The present disclosure is further illustrated in terms of exemplary embodiments. These exemplary embodiments are described in detail with reference to the drawings. These embodiments are not restrictive, in which the same numbering indicates the same structure, wherein:

FIG. 15 is a schematic diagram illustrating a structure of a vibration sensor according to some embodiments of the present disclosure;

DETAILED DESCRIPTION

Figure 1:
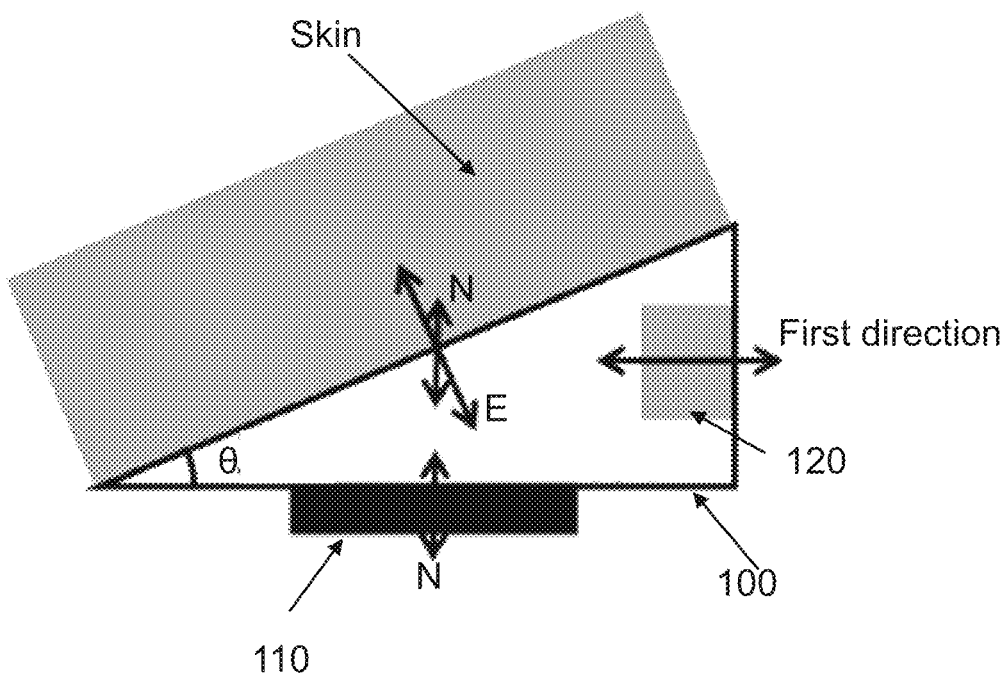
FIG. 1 is a schematic diagram illustrating an exemplary application scenario of a vibration sensor according to some embodiments of the present disclosure.

In order to more clearly illustrate the technical solution of the embodiments of the present disclosure, a brief description of the accompanying drawings required for the embodiment description is given below. Obviously, the accompanying drawings below are only some examples or embodiments of this description, and it is possible for ordinary technicians skilled in the art to apply this description to other similar scenarios according to these accompanying drawings without creative effort. Unless obviously obtained from the context or the context illustrates otherwise, the same numeral in the drawings refers to the same structure or operation.

It should be understood that "system," "device," "unit," and/or "module" as used herein is a manner for distinguishing different components, elements, parts, portions or assemblies of different levels. However, the words may be replaced by other expressions if other words can achieve the same purpose.

As indicated in the disclosure and claims, the terms "a," "an," "one," and/or "the" are not specific to the singular form and may include the plural form unless the context clearly indicates an exception. Generally speaking, the terms "comprising" and "including" merely prompt to include steps and elements that have been clearly identified, and these steps and elements do not constitute an exclusive listing.

The flowchart in the present disclosure is used to illustrate the operations performed by the system according to the embodiments of the present disclosure. It should be understood that the preceding or following operations are not necessarily performed in the exact order. Instead, various operations may be processed in reverse order or simultaneously. Meanwhile, other operations may be added to these procedures, or a certain operation or operations may be removed from these procedures.

The embodiments of the present disclosure relate to a vibration sensor. The vibration sensor may include a housing structure, a vibration unit, and an acoustic transducer. The housing structure may be physically connected to the acoustic transducer. An acoustic cavity may be formed at least partially by the housing structure and the acoustic transducer. The vibration unit may be located in the acoustic cavity formed by the housing structure and the acoustic transducer. In some embodiments, the vibration unit may include an elastic element and a mass element, and the elastic element and the mass element may be located in the acoustic cavity. The housing structure may be configured to generate vibrations based on an external signal. When the housing structure generate the vibrations based on the external signal, the vibrating unit may simultaneously generate vibrations in response to the vibrations of the housing structure, which causes a volume change of a first acoustic cavity. Therefore, the acoustic transducer may generate an electrical signal based on the volume change of the first acoustic cavity. In some embodiments, the elastic element may include a first elastic element and a second elastic element. The first elastic element and the second elastic element may be respectively connected to the mass element and distributed at intervals along a vibration direction of the vibration unit. For example, the first elastic element and the second elastic element may be distributed on two opposite sides of the mass element in the vibration direction of the vibration unit. As another example, the first elastic element and the second elastic element may be located between a peripheral side of the mass element and the housing or between the peripheral side of the mass element and the acoustic transducer. In some embodiments, the mass element (e.g., the first mass element and the second mass element) may also be distributed on two opposite sides of the elastic element in a first direction. In some embodiments, the first elastic element and the second elastic element may be respectively connected to the mass element and distributed at intervals along the vibration direction of the vibration unit, or the mass element (e.g., the first mass element and the second mass element) may be distributed on the two opposite sides of the elastic element in the first direction, so that a response sensitivity of the vibration unit to the vibrations of the housing structure in the first direction may be higher than the response sensitivity of the vibration unit to the vibrations of the housing structure in a second direction within a target frequency range (e.g., below 3000 Hz), wherein the second direction may be perpendicular to the first direction. For example, the first elastic element and the second elastic element may be respectively located on an upper surface and a lower surface of the mass element. The first elastic element and the second elastic element may be approximately regarded as an integrated part, and a centroid of the integrated part may approximately coincide with a center of gravity of the mass element. Taking a vibration sensor applied to an earphone (e.g., a bone conduction earphone) as an example, the vibration sensor may be used as a bone conduction microphone to collect a vibration signal generated by facial muscles of a user when the user speaks, and convert the vibration signal into an electrical signal including voice information. When the vibration sensor is integrated into the earphone, the vibration sensor may receive other vibration signals (e.g., a vibration signal of a loudspeaker, a vibration signal of an earphone housing, a noise signal in the outside air, etc.) while receiving the vibration signal generated by the facial muscles of the user when the user speaks. Different vibration signals may have different vibration directions. In the embodiments of the present disclosure, by setting the centroid of the elastic element to approximately coincide with the center of gravity of the mass element, the response sensitivity of the vibration unit to the vibrations of the housing structure in the first direction may be higher than the response sensitivity of the vibration unit to the vibrations of the housing structure in the second direction. In some application scenarios, the vibration sensor may be used to collect the vibration signal when the user speaks, the first direction may correspond to a vibration direction of the vibration signal generated by the facial muscles when the user speaks, and the second direction may correspond to a vibration direction of the other vibration signals (e.g., the vibration signal of the loudspeaker). In other application scenarios, when the vibration sensor is used to collect the noise signal of the external environment, the first direction may correspond to a vibration direction of the noise signal of the external environment, and the second direction may correspond to a vibration direction of the other vibration signals (e.g., the vibration signal of the loudspeaker), thereby improving a direction selectivity of the vibration sensor, and reducing interference caused by the other vibration signals to a target signal to be collected by the vibration sensor.

In some embodiments, the vibration sensor in the embodiments of the present disclosure may be applied to a mobile device, a wearable device, a virtual reality (VR) device, an augmented reality (AR) device, or the like, or any combination thereof. In some embodiments, the mobile device may include a smartphone, a tablet computer, a personal digital assistant (PDA), a gaming device, a navigation device, or the like, or any combination thereof. In some embodiments, the wearable device may include a smart bracelet, an earphone, a hearing aid, a smart helmet, a smart watch, smart clothing, a smart backpack, a smart accessory, or the like, or any combination thereof. In some embodiments, the VR device or the AR device may include a VR helmet, VR glasses, a VR patch, an AR helmet, AR glasses, an AR patch, or the like, or any combination thereof. For example, the VR device or the AR device may include Google Glass, Oculus Rift, Hololens, Gear VR, etc.

FIG. 1 is a schematic diagram illustrating an exemplary application scenario of a vibration sensor according to some embodiments of the present disclosure. Taking the vibration sensor applied to an earphone (e.g., a bone conduction earphone) as an example, as shown in FIG. 1, an earphone 100 may include a vibration loudspeaker 110 and a vibration sensor 120. When a user wears the earphone 100 shown in FIG. 1, the earphone 100 may be in contact with a skin region of the user's head. When the earphone 100 is in a working state, the vibration loudspeaker 110 may generate a vibration signal (also referred to as a first vibration signal) based on an audio signal, the vibration signal may be transmitted to the skin of the user's head through a housing or other structures of the earphone 100, and the vibration signal may be transmitted to an auditory nerve of the user through bones or muscles of the head. The other structures may include a vibration plate. When the user is talking or recording, sound produced from vocal cords of the user when the user speaks may be transmitted to a skin surface through bones, and may drive the housing of the earphone 100 to generate a vibration signal (also referred to as a second vibration signal). The vibration sensor 120 may collect the vibration signal based on the vibrations of the housing structure, and convert the vibration signal into an electrical signal including voice information. In some application scenarios, for example, when the user uses the earphone 100 to make a call or input the voice information, the vibration signal to be collected by the vibration sensor 120 may be the vibration signal generated by the facial muscles when the user speaks, and the vibration signal may be regarded as a target signal. A vibration direction of the target signal may be a direction of a double-headed arrow E shown in FIG. 1, and the target signal may be the vibration signal to be collected by the vibration sensor 120. The vibration loudspeaker 110 of the earphone 100 may also generate a vibration signal in the working state. Vibrations of the external air may also act on the earphone 100 to generate a vibration signal (also referred to as a third vibration signal). These vibration signals may be regarded as noise signals. In order to prevent the noise signals from affecting the target signal, the vibration loudspeaker 110 and the vibration sensor 120 of the earphone 100 may be vertically or approximately vertically disposed. The vibration loudspeaker 110 and the vibration sensor 120 being vertically or approximately vertically disposed refers to that a vibration direction (e.g., a direction of a double-headed arrow N shown in FIG. 1) of the vibration loudspeaker 110 may be perpendicular or approximately perpendicular to a vibration direction (i.e., a first direction shown in FIG. 1) of the vibration sensor 120. Being approximately vertical refers to that a normal line of the vibration loudspeaker 110 and a normal line of the vibration sensor 120 may have an included angle within a certain angle range. In some embodiments, the included angle may be within a range of 75° to 115°. In some embodiments, the included angle may be within a range of 80° to 100°. In some embodiments, the included angle may be within a range of 85° to 95°. In some embodiments, in order to reduce the impact of vibrations generated by the contact between the earphone 100 and a facial skin of the user on the target signal, a certain angle θ (e.g., less than 90°) may be set between the vibration direction of the vibration loudspeaker 110 and a plane where a skin contact region of the user is located.

Figure 2:
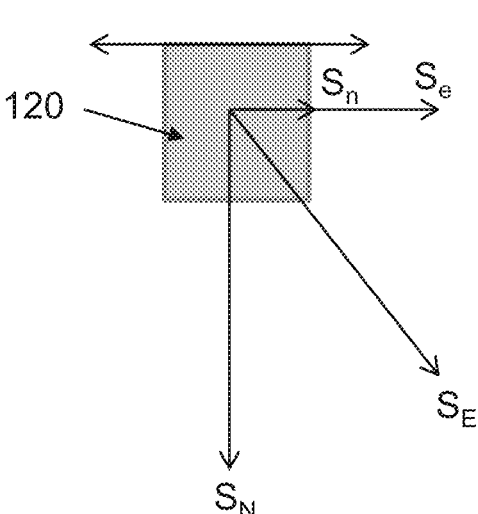
FIG. 2 is a schematic diagram illustrating a vibration signal of the vibration sensor shown in FIG. 1.

FIG. 2 is a schematic diagram illustrating a vibration signal of the vibration sensor shown in FIG. 1. Referring to FIG. 1 and FIG. 2, the vibration direction of the vibration unit of the vibration sensor 120 may be the first direction. A vibration signal generated by the vibration loudspeaker 110 may be SN. As used herein, when the vibration direction of the vibration loudspeaker 110 is not perpendicular to the skin contact region of the user, the vibration signal SN generated by the vibration loudspeaker 110 may have a signal component Sn in the first direction, and the signal component Sn may also be regarded as a noise signal. The vibration signal (i.e., the target signal) generated by the facial muscles when the user speaks may be SE. As used herein, Se may be a signal component of the target signal SE in the first direction, and the signal component may be picked up by the vibration sensor 120. In the vibration unit of the vibration sensor 120 provided in the embodiments of the present disclosure, by setting a centroid or a center of gravity of an elastic element to approximately coincide with a center of gravity of a mass element, a response sensitivity of the vibration unit to the vibrations of the housing structure in the first direction may be higher than the response sensitivity of the vibration unit to the vibrations of the housing structure in a second direction, so that the vibration sensor 120 may better receive the effective component Se in the first direction of the vibration signal (the target signal SE) generated by the facial muscles when the user speaks, and influence of the vibration signal Sn of the vibration loudspeaker 110 in the second direction on the vibration sensor 120 may be reduced, thereby improving a direction selectivity of the vibration sensor, and reducing the interference caused by the non-target vibration signals to the target signal to be collected by the vibration sensor. It should be noted that the approximate coincidence of the centroid of the elastic element and the center of gravity of the mass element means that the elastic element has a regular geometric structure (e.g., a cylindrical structure, a ring structure, a cuboid structure, etc.) with a uniform density, and the centroid of the elastic element approximately coincides with the center of gravity of the mass element. At this time, the centroid of the elastic element may be regarded as the center of gravity of the elastic element. In some embodiments, when the elastic element is an irregular structure or has a non-uniform density, it can be regarded as that an actual center of gravity of the elastic element approximately coincides with the center of gravity of the mass element.

Figure 3:
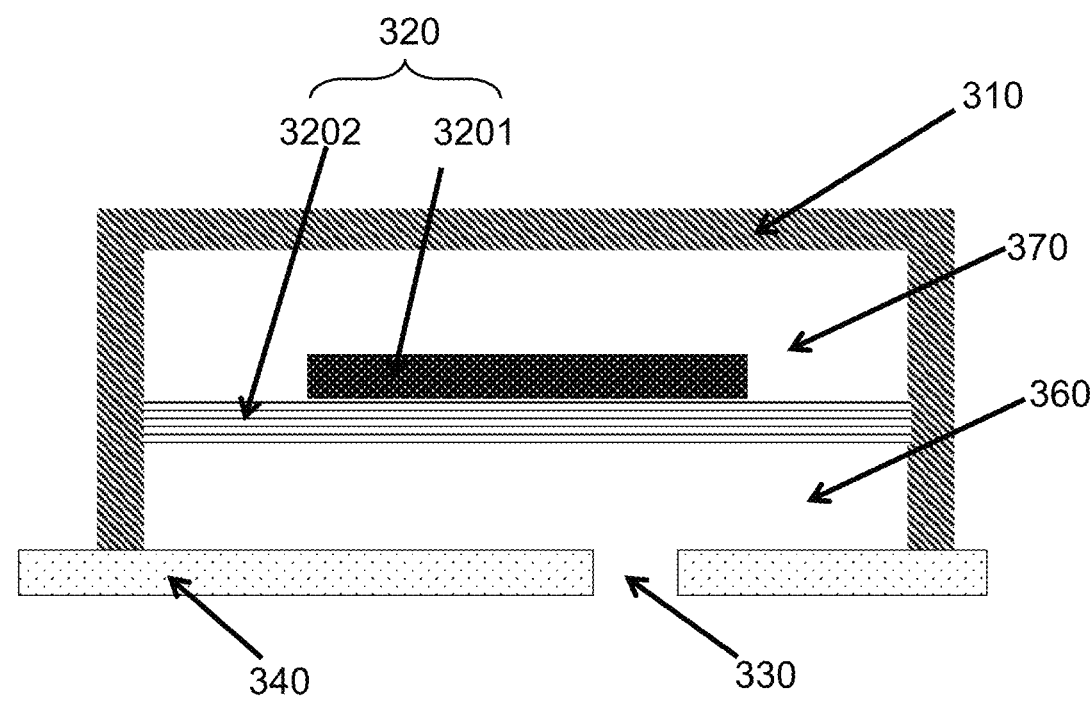
FIG. 3 is a schematic diagram illustrating a structure of a vibration sensor according to some embodiments of the present disclosure.

FIG. 3 is a schematic diagram illustrating a structure of a vibration sensor according to some embodiments of the present disclosure. As shown in FIG. 3, a vibration sensor 300 may include a housing structure 310, an acoustic transducer, and a vibration unit 320. In some embodiments, a shape of the vibration sensor 300 may be a cuboid, a cylinder, etc., or other irregular structures. In some embodiments, the housing structure 310 may be made of a material with a certain hardness, so that the housing structure 310 can protect the vibration sensor 300 and internal components (e.g., the vibration unit 320) thereof. In some embodiments, a material of the housing structure 310 may include a metal, an alloy material, a polymer material, or the like, or any combination thereof. The polymer material may include acrylonitrile-butadiene-styrene copolymer, polyvinyl chloride, polycarbonate, polypropylene, etc. In some embodiments, the housing structure 310 may be connected to the acoustic transducer. A connection manner may include welding, clamping, bonding, integral molding, or the like, or any combination thereof. In some embodiments, the housing structure 310 and the acoustic transducer may form an acoustic cavity. The vibration unit 320 may be located in the acoustic cavity. The vibration unit 320 may divide the acoustic cavity into a first acoustic cavity 360 and a second acoustic cavity 370. The acoustic transducer may convert a vibration signal of the acoustic cavity inside the housing structure 310 into an electrical signal. For instance, when the vibration sensor 300 is working, an external vibration signal may be transmitted to the vibration unit 320 through the housing structure 310, and the vibration unit 320 may generate vibrations in response to vibrations of the housing structure 310. Since a vibration phase of the vibration unit 320 is different from a vibration phase of the housing structure 310 and a vibration phase of the acoustic transducer, the vibrations of the vibration unit 320 may cause a volume change of the first acoustic cavity 360 of the housing structure 310, thereby causing a sound pressure change of the first acoustic cavity 360. The acoustic transducer may detect the sound pressure change of the first acoustic cavity 360 and convert the sound pressure change of the first acoustic cavity 360 into the electrical signal. In some embodiments, the acoustic transducer may include a substrate 340. The housing structure 310 may be connected to the acoustic transducer through the substrate 340. In some embodiments, the substrate 340 may be a rigid circuit board (e.g., a printed circuit board (PCB)) or a flexible circuit board (e.g., a flexible printed circuit board (FPC)). In some embodiments, the substrate 340 may include one or more sound inlets 330. The first acoustic cavity 360 may be in communication with the acoustic transducer through the one or more sound inlets 330. In some embodiments, the acoustic transducer may further include at least one diaphragm (not shown in FIG. 3). The at least one diaphragm may be disposed at the one or more sound inlets 330. When the external vibration signal acts on the housing structure 310, a sound pressure of the first acoustic cavity 360 may change, and the at least one diaphragm may generate mechanical vibrations in response to the sound pressure change of the first acoustic cavity 360, and a magnetic circuit system of the acoustic transducer may generate the electrical signal based on the mechanical vibrations of the at least one diaphragm.

In some embodiments, the vibration unit 320 may include an elastic element 3202 and a mass element 3201. The mass element 3201 and the elastic element 3202 may be located in the acoustic cavity. The mass element 3201 may be connected to the housing structure 310 through the elastic element 3202. For instance, a peripheral side of the elastic element 3202 may be connected to an inner wall of the housing structure 310, and the mass element 3201 may be located on an upper surface or a lower surface of the elastic element 3202. The upper surface of the elastic element 3202 may be a surface of the elastic element 3202 perpendicular to a vibration direction of the elastic element 320 and away from a surface of the acoustic transducer, for example, the substrate 340. The lower surface of the elastic element 3202 may be a surface of the elastic element 3202 perpendicular to the vibration direction of the elastic element 320 and close to the surface of the acoustic transducer, for example, the substrate 340. The mass element 3201 may increase a vibration amplitude of the elastic element 3202 with respect to the housing structure 310, so that a volume change value of the first acoustic cavity 360 can change significantly under the action of external vibration signals of different sound pressure levels and different frequencies, thereby improving a sensitivity of the vibration sensor 300. In some embodiments, a structure of the elastic element 3202 may be a film structure. In some embodiments, the mass element 3201 may be a regular structure (e.g., a cuboid, a cylinder, etc.) or an irregular structure. In some embodiments, a material of the mass element 3201 may be a metallic material or a non-metallic material. The metallic material may include steel (e.g., stainless steel, carbon steel, etc.), a light alloy (e.g., an aluminum alloy, beryllium copper, a magnesium alloy, a titanium alloy, etc.), or the like, or any combination thereof. The non-metallic material may include a polyurethane foam material, glass fibers, carbon fibers, graphite fibers, silicon carbide fibers, or the like, or any combination thereof. In some embodiments, a material of the elastic element 3202 may include sponge, rubber, silicone, plastic, foam, polydimethylsiloxane (PDMS), polyimide (PI), or the like, or any combination thereof. In some embodiments, a thickness of the elastic element 3202 may be within a range of 0.1 μm to 500 μm. In some embodiments, the thickness of the elastic element 3202 may be within a range of 0.5 μm to 300 μm. In some embodiments, the thickness of the elastic element 3202 may be within a range of 1 μm to 50 μm. In some embodiments, a thickness of the mass element 3201 may be within a range of 10 μm to 1000 μm. In some embodiments, the thickness of the mass element 3201 may be within a range of 20 μm to 800 μm. In some embodiments, the thickness of the mass element 3201 may be within a range of 50 μm to 500 μm. In some embodiments, the mass element 3201 may be located at a center of the elastic element 3202. In some embodiments, a size (e.g., a length and a width) of the mass element 3201 may be less than a size of the elastic element 3202. A space distance may be disposed between the peripheral side of the mass element 3201 and the inner wall of the housing structure 310. The space distance may prevent the mass element 3201 from colliding with the housing structure 310 when the mass element generates the vibrations with respect to the housing structure 310. In some embodiments, the space distance between the peripheral side of the mass element 3201 and the inner wall of the housing structure 310 may be within a range of 1 μm to 1000 μm. In some embodiments, the space distance between the peripheral side of the mass element 3201 and the inner wall of the housing structure 310 may be within a range of 20 μm to 800 μm. In some embodiments, the space distance between the peripheral side of the mass element 3201 and the inner wall of the housing structure 310 may be within a range of 50 μm to 500 μm. In some embodiments, within a target frequency range, a ratio (also referred to as a relative transverse sensitivity) of a resonant frequency of the vibration sensor 300 in the second direction to a resonant frequency of the vibration sensor 300 in the first direction may be changed by adjusting the size (e.g., the length and the width) of the mass element 3201, so that the sensitivity of the vibration sensor 300 in the second direction is reduced on the premise that the sensitivity of the vibration sensor 300 in the first direction does not change significantly. In some embodiments, a ratio of a vibration frequency of the vibration sensor in the second direction to a vibration frequency of the vibration sensor in the first direction may be larger than 1. In some embodiments, the ratio of the vibration frequency of the vibration sensor in the second direction to the vibration frequency of the vibration sensor in the first direction may be larger than 1.5. In some embodiments, the ratio of the vibration frequency of the vibration sensor in the second direction to the vibration frequency of the vibration sensor in the first direction may be larger than 2. In some embodiments, a ratio of the size (e.g., the length or the width) of the mass element 3201 to the size of the elastic element 3202 may be within a range of 0.2 to 0.9. In some embodiments, the ratio of the size of the mass element 3201 to the size of the elastic element 3202 may be within a range of 0.3 to 0.7. In some embodiments, the ratio of the size of the mass element 3201 to the size of the elastic element 3202 may be within a range of 0.5 to 0.7. Merely by way of example, the size (e.g., the length or the width) of the mass element 3201 may be ½ of the size of the elastic element 3202. As another example, the size (e.g., the length or the width) of the mass element 3201 may be ¾ of the size of the elastic element 3202. In some embodiments, the first direction refers to a thickness direction of the mass element 3201, and the second direction may be perpendicular to the first direction. In this embodiment, the elastic element 3202 may be more likely to elastically deform than the housing structure 310, so that the vibration unit 320 can move with respect to the housing structure 310. When external vibrations act on the housing structure 310, components (e.g., the housing structure 310, the acoustic transducer, the vibration unit 320, etc.) may generate vibrations simultaneously. Since the vibration phase of the vibration unit 320 is different from the vibration phase of the housing structure 310 and the vibration phase of the acoustic transducer, a volume change of the acoustic cavity may be caused, resulting in a sound pressure change of the acoustic cavity, and the acoustic transducer may convert the sound pressure change of the acoustic cavity into an electrical signal, thereby picking up the sound.

It should be noted that the shape of the elastic element 3202 may not be limited to the film structure shown in FIG. 3, but may also be other elastically deformable structures, such as a spring structure, a metal ring, a ring structure, a columnar structure, etc.

Figure 4:
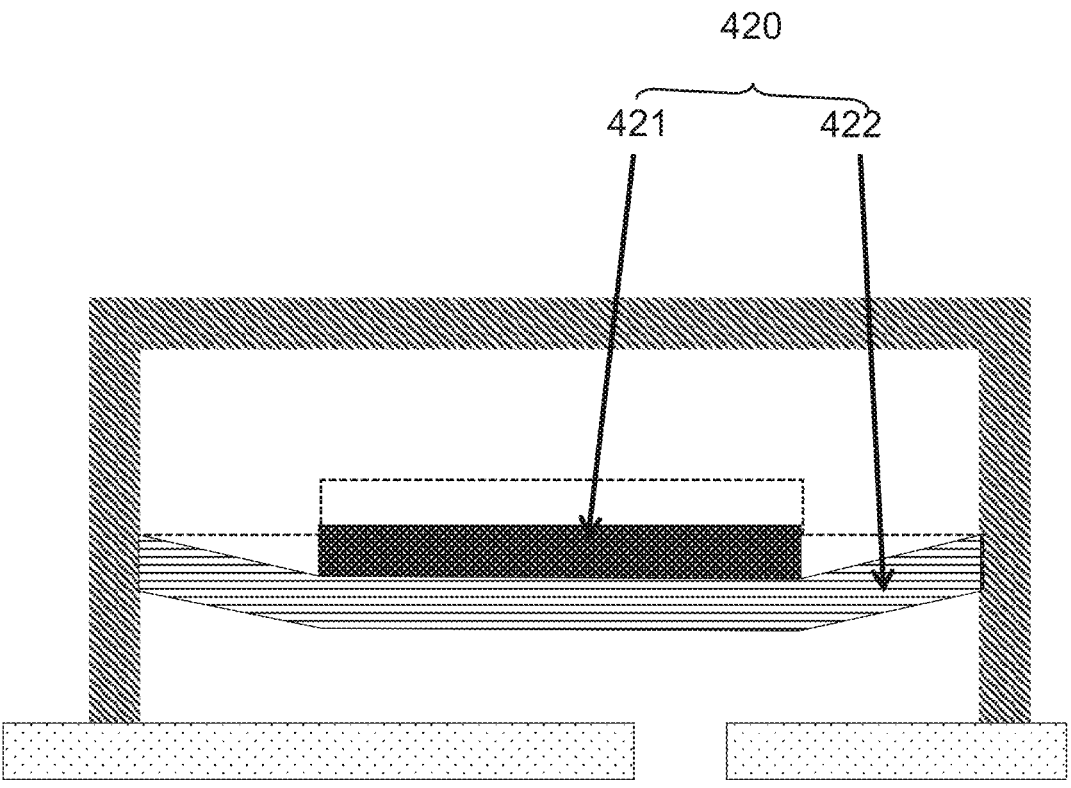
FIG. 4 is a schematic diagram illustrating a vibration mode of a vibration sensor in a first direction according to some embodiments of the present disclosure.
Figure 4:
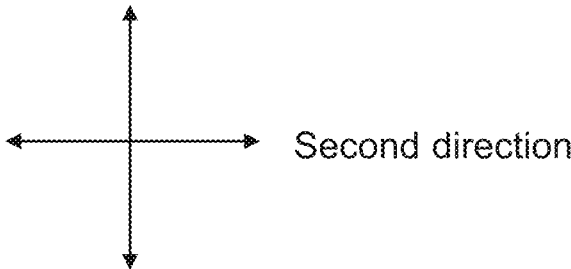
Figure 5:
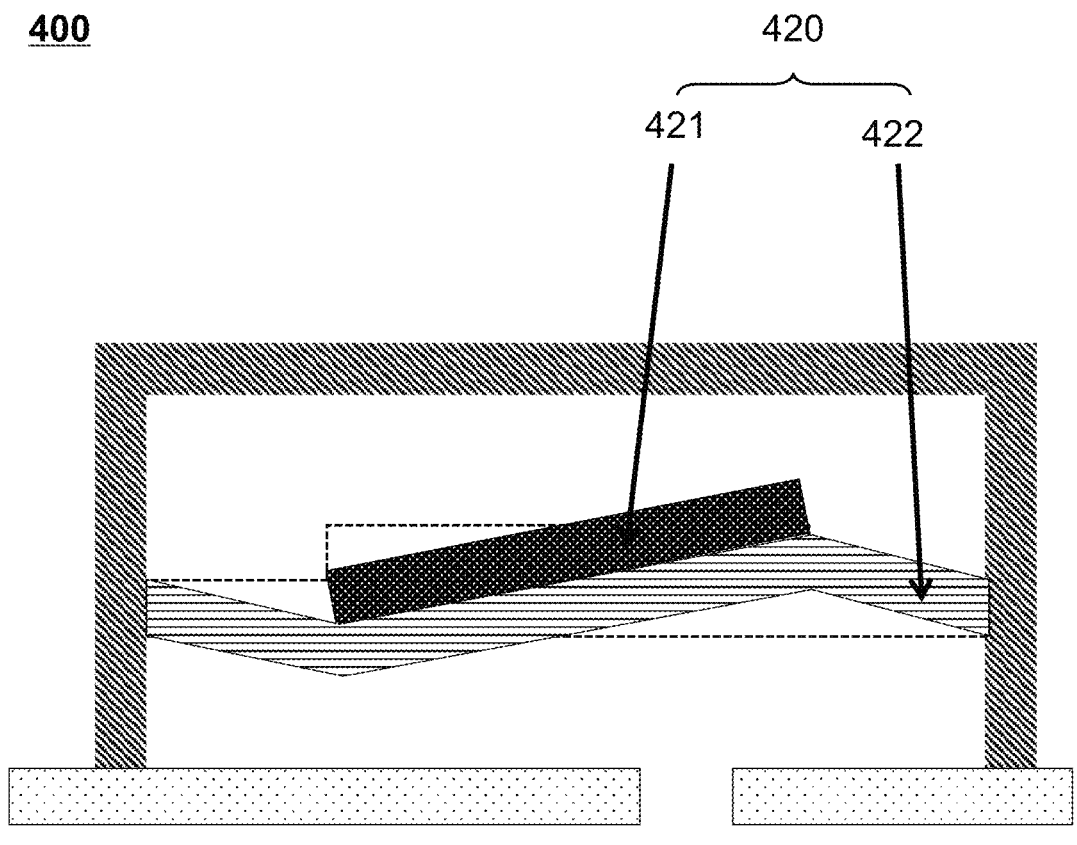
FIG. 5 is a schematic diagram illustrating a vibration mode of a vibration sensor in a second direction according to some embodiments of the present disclosure.

FIG. 4 is a schematic diagram illustrating a vibration mode of a vibration sensor in a first direction according to some embodiments of the present disclosure. FIG. 5 is a schematic diagram illustrating a vibration mode of a vibration sensor in a second direction according to some embodiments of the present disclosure. As shown in FIG. 4 and FIG. 5, when a vibration sensor 400 receives vibration signals in different vibration directions, vibration conditions of a vibration unit 420 may also be different. As shown in FIG. 4, in some embodiments, when the vibration sensor 400 receives a vibration signal from a first direction, a mass element 421 of the vibration unit 420 may generate vibrations along the first direction, and an elastic element 422 may generate an elastic deformation in the first direction under an action of the mass element 421. Left and right sides of the mass element 421 may have a same displacement in the first direction, and left and right sides of the elastic element 422 may have a same elastic deformation in the first direction. As shown in FIG. 5, when the vibration sensor 400 receives a vibration signal from a second direction, the mass element 421 and the elastic element 422 may generate a wave-like motion. For example, vibration amplitudes on the left side and the right side of the mass element 421 and the elastic element 422 may be different. It can be seen that when the vibration sensor 400 receives a target signal, other vibration signals (e.g., signals with different vibration directions from the target signal) may interfere with the target signal. In some embodiments, in order to reduce the interference of the other vibration signals as much as possible when the vibration sensor receives the target signal, the vibration unit 420 (e.g., the elastic element 422 and the mass element 421) may be adjusted. For example, an elastic support structure may be disposed in a first acoustic cavity. The elastic support structure may be connected between the elastic element and a substrate structure (or the housing structure) for supporting the elastic element and preventing the elastic element from generating a vibration mode shown in FIG. 5. For instance, the elastic support structure may be symmetrically supported on the left and right sides (e.g., near a peripheral side where the mass element 421 on the elastic element 422 is located) of the elastic element, so that the vibrations on the left and right sides of the elastic element may be synchronized as much as possible.

Figure 6:
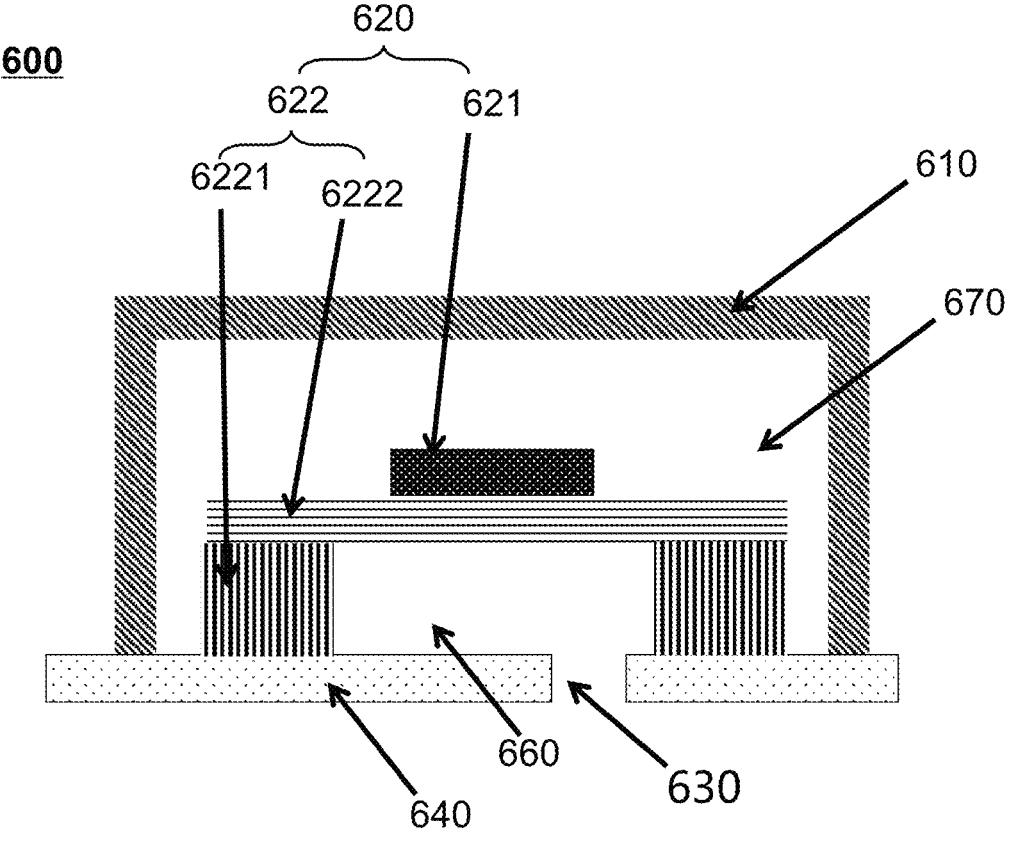
FIG. 6 is a schematic diagram illustrating a structure of a vibration sensor according to some embodiments of the present disclosure.

FIG. 6 is a schematic diagram illustrating a structure of a vibration sensor according to some embodiments of the present disclosure. A vibration sensor 600 shown in FIG. 6 may include a housing structure 610, an acoustic transducer, and a vibration unit 620. The vibration sensor 600 in FIG. 6 may be the same as or similar to the vibration sensor 300 in FIG. 3. For example, the housing structure 610 of the vibration sensor 600 may be the same as or similar to the housing structure 310 of the vibration sensor 300. As another example, a substrate structure 640 of the vibration sensor 600 may be the same as or similar to the substrate 340 of the vibration sensor 300. As still another example, a first acoustic cavity 660 of the vibration sensor 600 may be the same as or similar to the first acoustic cavity 360 of the vibration sensor 300. More descriptions regarding more structures (e.g., a second acoustic cavity 670, a sound inlet 630, a mass element 621, etc.) of the vibration sensor 600 may be found in FIG. 3 and relevant descriptions thereof.

In some embodiments, the vibration unit 620 may include the mass element 621 and an elastic element 622. The elastic element 622 may be located on one side of the mass element 621 in a first direction. For example, the mass element 621 may be located on an upper surface of the elastic element 622. In some other embodiments, the mass element 621 may also be located on a lower surface of the elastic element 622.

In some embodiments, the main difference between the vibration sensor 600 in FIG. 6 and the vibration sensor 300 in FIG. 3 may include that the elastic element 622 may include a first elastic element 6221 and a second elastic element 6222, and the first elastic element 6221 and the second elastic element 6222 may be located on a same side of the mass element 621. As shown in FIG. 6, the mass element 621 may be connected to the first elastic element 6221 through the second elastic element 6222, and the first elastic element 6221 may be connected to the substrate structure 640 of the acoustic transducer 600. For instance, the mass element 621, the second elastic element 6222, and the first elastic element 6221 may be connected in sequence from top to bottom. A lower surface of the first elastic element 6221 may be connected to the substrate structure 640 of the acoustic transducer 600. An upper surface of the first elastic element 6221 may be connected to a lower surface of the second elastic element 6222. The mass element 621 may be located on an upper surface of the second elastic element 6222.

Figure 7:
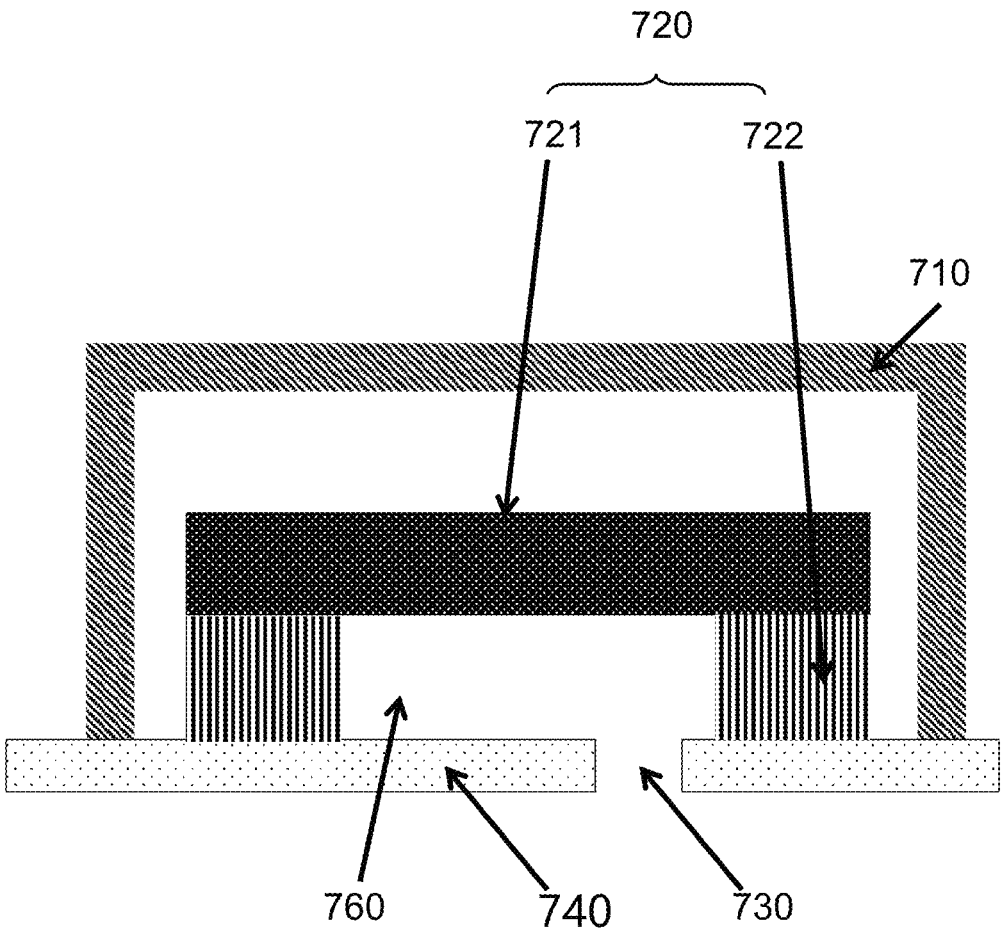
FIG. 7 is a schematic diagram illustrating a structure of a vibration sensor according to some embodiments of the present disclosure.
Figure 7:
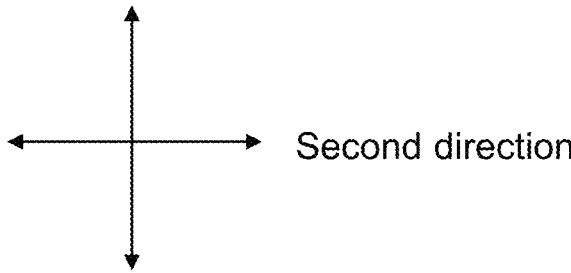

In some embodiments, the first elastic element 6221 may be a ring structure, and the second elastic element 6222 may be a film structure. An inner side of the first elastic element 6221, the lower surface of the second elastic element 6222, and the substrate structure 640 of the acoustic transducer may form the first acoustic cavity 660. The first acoustic cavity 660 may be in communication with the sound inlet 630 disposed at the substrate structure 640. The first elastic element 6221 and the second elastic element 6222 may be made of a same material or different materials. More descriptions regarding the material of the first elastic element 6221 or the second elastic element 6222 may be found in the descriptions of the elastic element 3202 in FIG. 3, which is not repeated herein. In some embodiments, the first elastic element 6221 and the second elastic element 6222 may be formed an integrated structure. Alternatively, the first elastic element 6221 and the second elastic element 6222 may be independent structures with respect to each other. In some embodiments, the first elastic element 6222 may also be connected to the housing structure 610 through a peripheral side of the first elastic element 6222. In a second direction, the first elastic element 6221 may be symmetrically supported on left and right sides (e.g., the peripheral side where the mass element 621 of the second elastic element 6222 is located) of the second elastic element 6222 with a centerline of the mass element 621 or a centerline of the second elastic element 6222, which makes vibrations of the left and right sides of the second elastic element 6222 and vibrations of the left and right sides of the mass element 621 as synchronous as possible, thereby reducing a response sensitivity of the vibration unit 620 to vibrations of the housing structure 610 in the second direction. In some embodiments, a ratio (also referred to as a relative transverse sensitivity) of a resonant frequency of the vibration sensor 600 in the second direction to a resonant frequency of the vibration sensor 600 in a first direction may be changed by adjusting a size (e.g., a length and a width) of the mass element 621. Therefore, within a target frequency range, a sensitivity of the vibration sensor 600 in the second direction may be reduced on the premise that the sensitivity of the vibration sensor 600 in the first direction does not change significantly. More descriptions regarding the size of the mass element 621 and the elastic element 622 may be found elsewhere in the present disclosure (e.g., FIG. 3 and relevant descriptions thereof). FIG. 7 is a schematic diagram illustrating a structure of a vibration sensor according to some embodiments of the present disclosure. As shown in FIG. 7, a vibration sensor 700 may include a housing structure 710, an acoustic transducer, and a vibration unit 720. The vibration sensor shown in FIG. 7 may be the same as or similar to the vibration sensor 600 shown in FIG. 6. For example, a housing structure 710 of the vibration sensor 700 may be the same as or similar to the housing structure 610 of the vibration sensor 600. As another example, a first acoustic cavity 760 of the vibration sensor 700 may be the same as or similar to the first acoustic cavity 660 of the vibration sensor 600. As still another example, a substrate structure 740 and a sound inlet 730 of the vibration sensor 700 may be the same as or similar to the substrate structure 640 and the sound inlet 630 of the vibration sensor 600, respectively.

In some embodiments, as shown in FIG. 7, the main difference between the vibration sensor 700 and the vibration sensor 600 may include that the vibration unit 720 may include a mass element 721 and an elastic element 722, the mass element 721 may be connected to the substrate structure 740 through the elastic element 722, and the elastic element 722 may be connected to the substrate structure 740 of the acoustic transducer 700. For instance, the mass element 721, the elastic element 722, and the substrate structure 740 may be connected in sequence from top to bottom. A lower surface of the mass element 721 may be connected to an upper surface of the elastic element 722, and a lower surface of the elastic element 722 may be connected to the substrate structure 740 of the acoustic transducer 700.

In some embodiments, the elastic element 722 may be a ring structure. An inner side of the elastic element 722, the lower surface of the mass element 721, and the substrate structure 740 may form the first acoustic cavity 760. The first acoustic cavity 760 may be in communication with the sound inlet 730 disposed at the substrate structure 740. More descriptions regarding a material of the elastic element 722 may be found in the descriptions of the elastic element 3202 in FIG. 3, which are not repeated herein. In some embodiments, the elastic element 722 and the mass element 721 may be formed an integrated structure. Alternatively, the elastic element 722 and the mass element 721 may be independent structures with respect to each other. In some embodiments, a ratio (also referred to as a relative transverse sensitivity) of a resonant frequency of the vibration sensor in a second direction to a resonant frequency of the vibration sensor in a first direction may be changed by adjusting a size (e.g., a length and a width) of the mass element 721. Therefore, within a target frequency range, a sensitivity of the vibration sensor 700 in the second direction may be reduced on the premise that the sensitivity of the vibration sensor 700 in the first direction does not change significantly. More descriptions regarding the size of the mass element 721 and the elastic element 722 may be found elsewhere in the present disclosure (e.g., FIG. 3 and relevant descriptions thereof).

In some embodiments, in order to reduce vibrations of the vibration unit (e.g., the vibration unit 320 in FIG. 3) in the second direction, a hardness of a region of the elastic element in contact with a peripheral side of the mass element may be set to be larger than hardnesses of other regions, so that a deformation of the elastic element generated in the second direction under an action of the mass element may be relatively small, and the sensitivity of the vibration sensor in the second direction may be reduced. In some embodiments, different regions of the elastic element may have different hardnesses by setting different materials for different regions of the elastic element. In some embodiments, different regions of the elastic element having different hardnesses may be realized in other manners. For example, an additional structure (e.g., an adhesive layer) may be disposed on a surface of an edge region of the elastic element in contact with the mass element.

In some embodiments, in order to reduce the interference of other vibration signals as much as possible when the vibration sensor receives the target signal, the vibration unit (e.g., the elastic element and the mass element) may be adjusted. For example, by disposing the elastic element approximately symmetrically distributed in the first direction with respect to the mass element in the vibration sensor, or setting the mass element approximately symmetrically distributed in the first direction with respect to the elastic element, a distance between a center of gravity of the mass element and a centroid of the elastic element may be limited within a specific range (e.g., the distance between the centroid of the elastic element and the center of gravity of the mass element in the first direction may not be larger than ⅓ of a thickness of the mass element), so that a sensitivity of the vibration sensor in the second direction may be reduced, thereby improving a direction selectivity of the vibration sensor, and enhancing anti-noise interference capability of the vibration sensor. More descriptions regarding further improving the sensitivity of the vibration sensor in the first direction while reducing the sensitivity of the vibration sensor in the second direction may be found in FIGS. 8-17 and relevant descriptions thereof.

Figure 8:
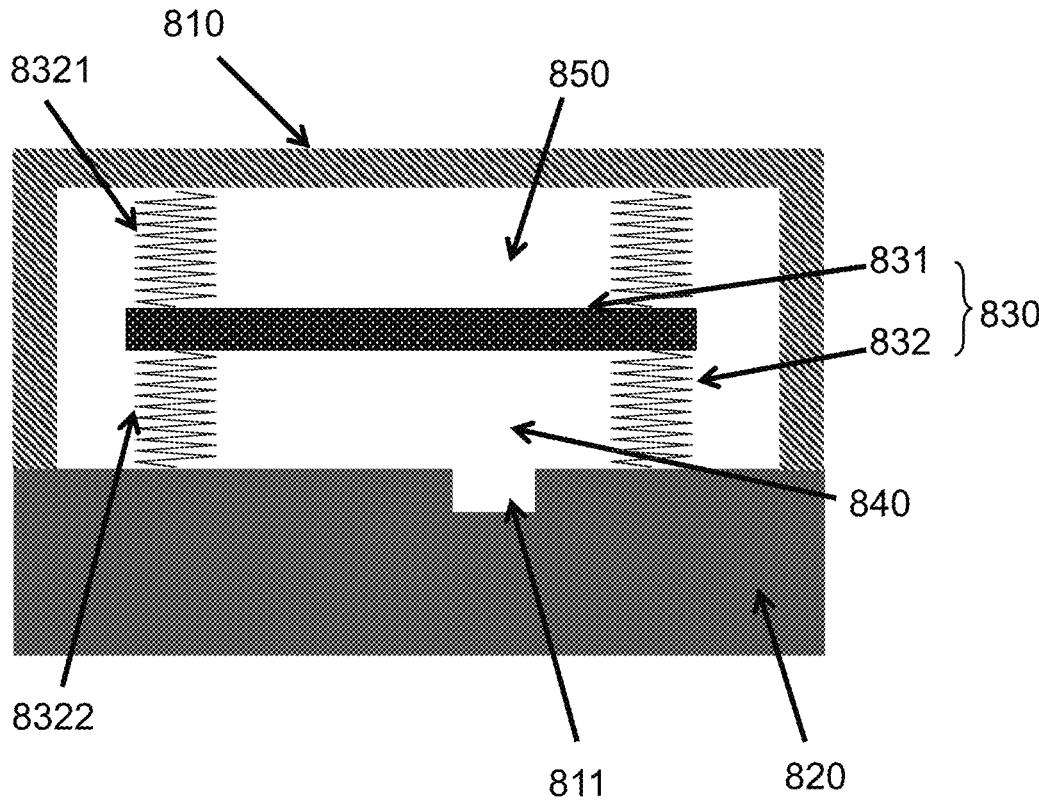
FIG. 8 is a schematic diagram illustrating a structure of a vibration sensor according to some embodiments of the present disclosure.
Figure 8:
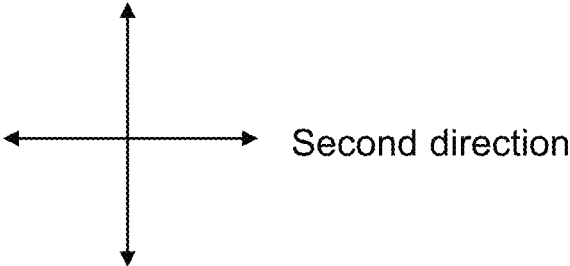

FIG. 8 is a schematic diagram illustrating a structure of a vibration sensor according to some embodiments of the present disclosure. As shown in FIG. 8, a vibration sensor 800 may include a housing structure 810, an acoustic transducer 820, and a vibration unit 830. In some embodiments, a shape of the housing structure 810 may be a regular structure (e.g., a cuboid, a cylinder, etc.) or an irregular structure. In some embodiments, the housing structure 810 may be made of a material with a certain hardness, so that the housing structure 810 can protect the vibration sensor 800 and internal components (e.g., the vibration unit 830) thereof. In some embodiments, a material of the housing structure 810 may include a metal, an alloy material, a polymer material (e.g., acrylonitrile-butadiene-styrene copolymer, polyvinyl chloride, polycarbonate, polypropylene etc.), or the like, or any combination thereof. In some embodiments, the housing structure 810 may be physically connected to the acoustic transducer 820. A physical connection may include welding, clamping, bonding, integral molding, or the like, or any combination thereof. In some embodiments, an acoustic cavity is formed at least partially by the housing structure 810 and the acoustic transducer 820. In some embodiments, the housing structure 810 may independently form a packaging structure with the acoustic cavity. The acoustic transducer 820 may be located in the acoustic cavity of the packaging structure. In some embodiments, the housing structure 810 may be a structure that is hollow inside and has an opening at one end. The acoustic transducer 820 may be physically connected to the open end of the housing structure 810 for packaging, thereby forming the acoustic cavity. In some embodiments, the vibration unit 830 may be located in the acoustic cavity, and the vibration unit 830 may divide the acoustic cavity into a first acoustic cavity 840 and a second acoustic cavity 850. In some embodiments, the first acoustic cavity 840 may be in acoustic communication with the acoustic transducer 820, and the second acoustic cavity 850 may be an acoustically sealed cavity structure. It should be noted that the plurality of acoustic cavities obtained by dividing the acoustic cavity through the vibration unit 830 may not be limited to the first acoustic cavity 840 and the second acoustic cavity 850, but may also include more acoustic cavities, for example, a third acoustic cavity, a fourth acoustic cavity, etc.

The vibration sensor 800 may convert an external vibration signal into an electrical signal. In some embodiments, the external vibration signal may include a vibration signal when a person speaks, a vibration signal generated by the skin moving with the human body or with the speaker working near the skin, a vibration signal generated by an object or air in contact with the vibration sensor, or the like, or any combination thereof. Furthermore, the electrical signal generated by the vibration sensor may be input to an external electronic device. In some embodiments, the external electronic device may include a mobile device, a wearable device, a virtual reality (VR) device, an augmented reality (AR) device, or the like, or any combination thereof. In some embodiments, the mobile device may include a smartphone, a tablet computer, a personal digital assistant (PDA), a gaming device, a navigation device, or the like, or any combination thereof. In some embodiments, the wearable device may include a smart bracelet, an earphone, a hearing aid, a smart helmet, a smart watch, smart clothing, a smart backpack, a smart accessory, or the like, or any combination thereof. In some embodiments, the VR device or the AR device may include a VR helmet, VR glasses, a VR patch, an AR helmet, AR glasses, an AR patch, or the like, or any combination thereof. For example, the VR device or the AR device may include Google Glass, Oculus Rift, Hololens, Gear VR, etc. For instance, when the vibration sensor 800 is working, the external vibration signal may be transmitted to the vibration unit 830 through the housing structure 810, and the vibration unit 830 may generate vibrations in response to vibrations of the housing structure 810. Since a vibration phase of the vibration unit 830 is different from a vibration phase of the housing structure 810 and a vibration phase of the acoustic transducer 820, the vibrations of the vibration unit 830 may cause a volume change of the first acoustic cavity 840, thereby causing a volume pressure change of the first acoustic cavity 840. The acoustic transducer 820 may detect the sound pressure change of the first acoustic cavity 840 and convert the sound pressure change of the first acoustic cavity 840 into an electrical signal. The electrical signal may be transmitted to the external electronic device through a welding spot (not shown in FIG. 8). The welding spot may be electrically connected to an internal component (e.g., a processor) of the earphone, the hearing aid, the AR glasses, the AR helmets, the VR glasses, etc., through a data line. The electrical signal obtained by the internal component may be transmitted to the external electronic device in a wired or wireless manner. In some embodiments, the acoustic transducer 820 may include at least one through hole 811 (also referred to as a sound guiding hole). The through hole 811 may be in communication with the first acoustic cavity 840, and a diaphragm (not shown in FIG. 8) may be disposed at the through hole 811. When a sound pressure of the first acoustic cavity 840 changes, the air inside the first acoustic cavity 840 may generate vibrations to act on the diaphragm through the through hole 811, causing the diaphragm to deform. The acoustic transducer 820 may convert a vibration signal of the diaphragm into an electrical signal.

In some embodiments, the vibration unit 830 may include a mass element 831 and an elastic element 832. The mass element 831 and the elastic element 832 may be located in the acoustic cavity formed by the housing structure 810 and the acoustic transducer 820. In some embodiments, the elastic element 832 may be distributed on two opposite sides of the mass element 831 in a first direction. The first direction refers to a thickness direction of the mass element 831. For example, the first direction may be the "first direction" indicated by the arrow in FIG. 8. In some embodiments, the mass element 831 may be connected to the housing structure 810 or the acoustic transducer 820 through the elastic element 832. In some embodiments, the elastic element 832 may include a first elastic element 8321 and a second elastic element 8322. The first elastic element 8321 and the second elastic element 8322 may be respectively connected to the mass element 831 and distributed at intervals along the first direction. For example, the first elastic element 8321 may be located on one side of the mass element 831 away from the acoustic transducer 820. It can also be understood that the first elastic element 8321 is located on an upper surface of the mass element 831. One end of the first elastic element 8321 may be connected to the housing structure 810, and another end of the first elastic element 8321 may be connected to the mass element 831. The second elastic element 8232 may be located on one side of the mass element 831 near the acoustic transducer 820. It can also be understood that the second elastic element 8322 is located on a lower surface of the mass element 831. One end of the second elastic element 8322 may be connected to the acoustic transducer 810, and another end of the second elastic element 8322 may be connected to the mass element 831. In some other embodiments, the elastic element 832 may also be located on a peripheral side of the mass element 831. The elastic element 832 may be a ring structure. An inner side of the ring structure may be connected to the peripheral side of the mass element 831, and an outer side of the ring structure may be connected to the housing structure 810 or the acoustic transducer 820. The peripheral side of the mass element 831 may be with respect to a vibration direction (e.g., the first direction) of the mass element 831. For convenience, the vibration direction of the mass element 831 with respect to the housing structure 810 may be an axial direction. At this time, the peripheral side of the mass element 831 refers to a side of the mass element 831 disposed around an axis. In some embodiments, the mass element 831 may be a regular structure (e.g., a cuboid, a cylinder, etc.) or an irregular structure. In some embodiments, a material of the mass element 831 may be a metallic material or a non-metallic material. The metallic material may include steel (e.g., stainless steel, carbon steel, etc.), a light alloy (e.g., an aluminum alloy, beryllium copper, a magnesium alloy, a titanium alloy, etc.), or the like, or any combination thereof. The non-metallic material may include a polyurethane foam material, glass fibers, carbon fibers, graphite fibers, silicon carbide fibers, or the like, or any combination thereof. In some embodiments, a shape of the elastic element 832 may be a round tube, a square tube, a special-shaped tube, a ring, a flat plate, or the like, or any combination thereof. In some embodiments, the elastic element 832 may have a structure (e.g., a spring structure, a metal ring, a film structure, a columnar structure, etc.) that is more likely to elastically deform. A material of the elastic element 832 may be a material that is more likely to elastically deform, e.g., silicone, rubber, etc. In the embodiments of the present disclosure, the elastic element 832 may be more likely to elastically deform than the housing structure 810, so that the vibration unit 830 can move with respect to the housing structure 810. It should be noted that, in some embodiments, the mass element 831 and any elastic element 832 of the elastic element 832 may be made of a same material or different materials, and then assembled to form the vibration unit 830. In some embodiments, the mass element 831 and any elastic element 832 of the elastic element 832 may also be made of the same material, and then integrated to form the vibration unit 830. The elastic element 832 and the mass element 831, the acoustic transducer 820, and the housing structure 810 may be bonded with an adhesive, or other connection manners (e.g., welding, clamping, etc.) known to those skilled in the art, which is not limited herein.

In some embodiments, the first elastic element 8321 and the second elastic element 8322 may be approximately symmetrically distributed in the first direction with respect to the mass element 831. In some embodiments, the first elastic element 8321 and the second elastic element 8322 may be connected to the housing structure 810 or the acoustic transducer 820. For example, the first elastic element 8321 may be located on one side of the mass element 831 away from the acoustic transducer 820. One end of the first elastic element 8321 may be connected to the housing structure 810, and another end of the first elastic element 8321 may be connected to an upper surface of the mass element 831. The second elastic element 8322 may be located on one side of the mass element 831 facing the acoustic transducer 820. One end of the second elastic element 8322 may be connected to the acoustic transducer 820, and another end of the second elastic element 8322 may be connected to a lower surface of the mass element 831. In some embodiments, by setting the first elastic element 8321 and the second elastic element 8322 to be approximately symmetrically distributed in the first direction with respect to the mass element 831 in the vibration sensor 800, a center of gravity of the mass element 831 may approximately coincide with a centroid of at least one elastic element 832, so that when the vibration unit 830 generates vibrations in response to the vibrations of the housing structure 810, vibrations of the mass element 831 in a second direction may be reduced, thereby reducing a response sensitivity of the vibrations of the vibration unit 830 in the second direction, and then improving a direction selectivity of the vibration sensor 800. The second direction may be perpendicular to the first direction. In some embodiments, the centroid of the elastic element 832 refers to a geometric center of the elastic element 832. The centroid of the elastic element 832 may be related to a shape and a size of the elastic element 832. For example, when the elastic element 832 is a rectangular plate-shaped structure, the centroid of the elastic element 832 may be located at an intersection of two diagonal lines of the rectangular plate-shaped structure. In some embodiments, the elastic element 832 may be approximately regarded as a structure with a uniform density. At this time, the centroid of the elastic element 832 may be approximately regarded as a center of gravity of the elastic element 832.

In some embodiments, the first elastic element 8321 and the second elastic element 8322 may also be approximately symmetrically distributed with respect to a centerline of the mass element 831 along the first direction, but asymmetrically distributed in the first direction. For example, the first elastic element 8321 may be located between the peripheral side of the mass element 831 and the housing structure 810, and the peripheral side of the mass element 831 may be connected to the housing structure 810 through the first elastic element 8321. The second elastic element 8322 may be located on the lower surface of the mass element 831, and the mass element 831 may be connected to the acoustic transducer 820 through the second elastic element 8322. As another example, heights (sizes in the first direction) of the first elastic element 8321 and the second elastic element 8322 may be different. As still another example, sizes (e.g., diameters or widths of the first elastic element 8321 and the second elastic element 8322) of the first elastic element 8321 and the second elastic element 8322 in the second direction may be different. By setting the first elastic element 8321 and the second elastic element 8322 to be approximately symmetrically distributed with respect to the centerline of the mass element 831 along the first direction in the vibration sensor 800, the vibrations of the mass element 831 in the second direction may also be reduced to a certain extent, thereby reducing a response sensitivity of the vibration unit 830 to the vibrations of the housing structure 810 in the second direction, and improving the direction selectivity of the vibration sensor 800. The centerline of the mass element 831 along the first direction refers to a straight line passing through the centroid of the mass element 831 and approximately parallel to the first direction.

In order to ensure that the first elastic element 8321 and the second elastic element 8322 are approximately symmetrically distributed with respect to the mass element 831 in the first direction, in some embodiments, sizes, shapes, materials, or thicknesses of the first elastic element 8321 and the second elastic element 8322 may be the same. In some embodiments, a structure of the first elastic element 8321 and a structure of the second elastic element 8322 may be film structures, columnar structures, tubular structures, ring structures, or the like, or any combination thereof. In some embodiments, the materials of the first elastic element 8321 and the second elastic element 8322 may include sponge, rubber, silica gel, plastic, foam, polydimethylsiloxane (PDMS), polyimide (PI), or the like, or any combination thereof. In some embodiments, the plastic may include polytetrafluoroethylene (PTFE), high molecular weight polyethylene, blow molded nylon, engineering plastics, or the like, or any combination thereof. The rubber refers to other single or composite materials capable of achieving a same performance, including but not limited to general-type rubber and special-type rubber. In some embodiments, the general-type rubber may include natural rubber, isoprene rubber, styrene-butadiene rubber, butadiene rubber, neoprene rubber, or the like, or any combination thereof. In some embodiments, the special-type rubber may include nitrile rubber, silicone rubber, fluororubber, polysulfide rubber, polyurethane rubber, epichlorohydrin rubber, acrylate rubber, propylene oxide rubber, or the like, or any combination thereof. The styrene-butadiene rubber may include emulsion polymerized styrene-butadiene rubber, solution-polymerized styrene-butadiene rubber, etc. In some embodiments, the composite material may include reinforcing materials, for example, glass fibers, carbon fibers, boron fibers, graphite fibers, graphene fibers, silicon carbide fibers, aramid fibers, or the like, or any combination thereof. In some embodiments, the size or the thickness of the first elastic element 8321 may also be slightly larger or smaller than the size or the thickness of the second elastic element 8322, so that the first elastic element 8321 and the second elastic element 8322 are approximately symmetrically distributed with respect to the center line of the mass element 831 along the first direction, but asymmetrically distributed in the first direction.

Merely by way of example, both the first elastic element 8321 and the second elastic element 8322 may be the film structures. One side of the first elastic element 8321 may be connected to the upper surface of the mass element 831, and one side of the second elastic element 8322 may be connected to the upper surface of the mass element 831. The peripheral sides of the first elastic element 8321 and the second elastic element 8322 may be respectively connected to the housing structure 810. The first elastic element 8321, the mass element 831, and the second elastic element 8322 may be connected in sequence from top to bottom along the first direction. By setting the first elastic element 8321 and the second elastic element 8322 to have the same material (e.g., polytetrafluoroethylene), size, and thickness, and setting the first elastic element 8321 and the second elastic element 8322 to be approximately symmetrically distributed with respect to the mass element 831 in the first direction, the centroid of the elastic element 832 may coincide with or approximately coincide with the center of gravity of the mass elements 831. Furthermore, when the vibration unit 830 generates the vibrations in response to the vibrations of the housing structure 810, the vibrations of the mass element 831 in the second direction may be reduced, thereby reducing the response sensitivity of the vibration unit 830 to the vibrations of the housing structure 810 in the second direction, and improving the direction selectivity of the vibration sensor 800 when receiving the vibration signal.

In some embodiments, when both the first elastic element 8321 and the second elastic element 8322 are the film structures, the first elastic element 8321 and the second elastic element 8322 may also be located between the peripheral side of the mass element 831 and the housing structure 810. The peripheral side of the mass element 831 may be connected to the housing structure 810 through the first elastic element 8321 and the second elastic element 8322. The arrangement may also make the centroid of the elastic element 832 coincide or approximately coincide with the center of gravity of the mass element 831, thereby improving the direction selectivity of the vibration sensor 800 when receiving the vibration signal.

Merely by way of example, both the first elastic element 8321 and the second elastic element 8322 may be the columnar structures (e.g., ring columnar structures or quasi-ring columnar structures) with a hollow region in a middle portion. The first elastic element 8321 and the second elastic element 8322 may respectively extend along the thickness direction of the mass element 831 and may be connected to the housing structure 810 or the acoustic transducer. Both ends of the first elastic element 8321 may be respectively connected to the housing structure 810 and the upper surface of the mass element 831. Both ends of the second elastic element 8322 may be respectively connected to the lower surface of the mass element 831 and the acoustic transducer 820. The first elastic element 8321 and the second elastic element 8322 may be made of the same material (e.g., polytetrafluoroethylene), size, and thickness, so that the centroid of the elastic element 832 can coincide with or approximately coincide with the center of gravity of the mass element 831.

In some embodiments, shapes and structures of the first elastic element 8321 and the second elastic element 8322 may also be different. For example, the first elastic element 8321 may be the film structure, the first elastic element 8321 may be located between the peripheral side of the mass element 831 and the housing structure 810, and the peripheral side of the mass element 831 may be connected to the housing structure 810 through the first elastic element 8321. The second elastic element 8322 may be the columnar structure, and the second elastic element 8322 may extend along the thickness direction of the mass element 831 and may be connected to the acoustic transducer.

In some embodiments, the first elastic element 8321 and the second elastic element 8322 may be distributed on two opposite sides of the mass element 831 in the first direction. The first elastic element 8321 and the second elastic element 8322 may be approximately regarded as an elastic element. The centroid of the elastic element may approximately coincide with the center of gravity of the mass element, so that within a target frequency range (e.g., below 3000 Hz), the response sensitivity of the vibration unit 830 to the vibrations of the housing structure 810 in the first direction is higher than the response sensitivity of the vibration unit 830 to the vibrations of the housing structure 810 in the second direction. In some embodiments, a difference between the response sensitivity of the vibration unit 830 to the vibrations of the housing structure 810 in the second direction and the response sensitivity of the vibration unit 830 to the vibrations of the housing structure 810 in the first direction may be within a range of −20 dB to −60 dB. In some embodiments, the difference between the response sensitivity of the vibration unit 830 to the vibrations of the housing structure 810 in the second direction and the response sensitivity of the vibration unit 830 to the vibrations of the housing structure 810 in the first direction may be within a range of −25 dB to −50 dB. In some embodiments, the difference between the response sensitivity of the vibration unit 830 to the vibrations of the housing structure 810 in the second direction and the response sensitivity of the vibration unit 830 to the vibrations of the housing structure 810 in the first direction may be within a range of −30 dB to −40 dB. In some embodiments, the target frequency range refers to a frequency range less than or equal to 3000 Hz.

In some embodiments, the vibration unit 830 may generate the vibrations in the first direction in response to the vibrations of the housing structure 810. The vibrations in the first direction may be regarded as a sound signal expected to be picked up by the vibration sensor 800, and the vibrations in the second direction may be regarded as a noise signal. Therefore, during a working process of the vibration sensor 800, the response sensitivity of the vibration unit 830 to the vibrations of the housing structure 810 in the second direction may be reduced by reducing the vibrations generated by the vibration unit 830 in the second direction, thereby improving the direction selectivity of the vibration sensor 800, and reducing the interference of the noise signal to the sound signal.

In some embodiments, the centroid of the elastic element 832 may coincide with or approximately coincide with the center of gravity of the mass element 831. In some embodiments, when the vibration unit 830 generates the vibrations in response to the vibrations of the housing structure 810, the centroid of the elastic element 832 may coincide with or approximately coincides with the center of gravity of the mass element 831, so that the vibrations of the mass element 831 in the second direction can be reduced on the premise that the response sensitivity of the vibration unit 830 to the vibrations of the housing structure 810 in the first direction is substantially constant, thereby reducing the response sensitivity of the vibration unit 830 to the vibrations of the housing structure 810 in the second direction, and improving the direction selectivity of the vibration sensor 800. In some embodiments, the response sensitivity of the vibration unit 830 to the vibrations of the housing structure 810 in the first direction may be changed (e.g., improved) by adjusting the thickness and an elastic coefficient of the elastic element 832, a mass and the size of the mass element 831, etc.

The centroid of the elastic element 832 coinciding with or approximately coinciding with the center of gravity of the mass element 831 can be understood as that the centroid of the elastic element 832 and the center of gravity of the mass element 831 satisfy a specific condition in the first direction and the second direction. In some embodiments, the specific condition may be that a distance between the centroid of the elastic element 832 and the center of gravity of the mass element 831 in the first direction is larger than ¼ of the thickness of the mass element 831, and a distance between the centroid of the elastic element 832 and the center of gravity of the mass element 831 in the second direction is larger than ¼ of a side length or a radius of the mass element 831. In some embodiments, the specific condition may be that the distance between the centroid of the elastic element 832 and the center of gravity of the mass element 831 in the first direction is not larger than ⅓ of the thickness of the mass element 831, and the distance between the centroid of the elastic element 832 and the center of gravity of the mass element 831 in the second direction is not larger than ⅓ of the side length or the radius of the mass element 831. In some embodiments, the distance between the centroid of the elastic element 832 and the center of gravity of the mass element 831 in the first direction may not be larger than ½ of the thickness of the mass element 831, and the distance between the centroid of the elastic element 832 and the center of gravity of the mass element 831 in the second direction may not be larger than ½ of the side length or the radius of the mass element 831. For example, when the mass element 831 is a cube, the distance between the centroid of the elastic element 832 and the center of gravity of the mass element 831 in the first direction may not be larger than ⅓ of the thickness (a side length) of the mass element 831, and the distance between the centroid of the elastic element 832 and the center of gravity of the mass element 831 in the second direction may not be larger than ⅓ of the side length of the mass element 831. As another example, when the mass element 831 is a cylinder, the distance between the centroid of the elastic element 832 and the center of gravity of the mass element 831 in the first direction may not be larger than ¼ of the thickness (the height) of the mass element 831, and the distance between the centroid of the elastic element 832 and the center of gravity of the mass element 831 in the second direction may not be larger than ¼ of a radius of a circle of the upper surface (or the lower surface) of the mass element 831.

In some embodiments, when the centroid of the elastic element 832 coincides with or approximately coincides with the center of gravity of the mass element 831, a resonant frequency of the vibrations of the vibration unit 830 in the second direction may shift to a high frequency without changing a resonant frequency of the vibrations of the vibration unit 830 in the first direction. In some embodiments, when the centroid of the elastic element 832 coincides with or approximately coincides with the center of gravity of the mass element 831, the resonant frequency of the vibrations of the vibration unit 830 in the first direction may remain substantially constant. For example, the resonant frequency of the vibrations of the vibration unit 830 in the first direction may be a frequency within a relatively strong frequency range (e.g., from 20 Hz to 2000 Hz, from 2000 Hz to 3000 Hz, etc.) that is perceived by human ears. The resonant frequency of the vibrations of the vibration unit 830 in the second direction may shift to a high frequency to be within a relatively weak frequency range (e.g., from 5000 Hz to 9000 Hz, from 1 kHz to 14 kHz, etc.) that is perceived by the human ears. By shifting the resonant frequency of the vibrations of the vibration unit 830 in the second direction to the high frequency, a ratio of the resonant frequency of the vibrations of the vibration unit 830 in the second direction to the resonant frequency of the vibrations of the vibration unit 830 in the first direction may be larger than or equal to 2 on the premise that the resonant frequency of the vibrations of the vibration unit 830 in the first direction remains substantially constant. In some embodiments, the ratio of the resonant frequency of the vibrations of the vibration unit 830 in the second direction to the resonant frequency of the vibrations of the vibration unit 830 in the first direction may be larger than or equal to other values. For example, the ratio of the resonant frequency of the vibrations of the vibration unit 830 in the second direction to the resonant frequency of the vibrations of the vibration unit 830 in the first direction may be larger than or equal to 1.5.

In some embodiments, the ratio of the resonant frequency of the vibrations of the vibration unit 830 in the second direction to the resonant frequency of the vibrations of the vibration unit 830 in the first direction may reflect the influence of the noise signal picked up by the vibration sensor 800 on the sound signal. For example, the larger the ratio of the resonant frequency of the vibrations of the vibration unit 830 in the second direction to the resonant frequency of the vibrations of the vibration unit 830 in the first direction, the higher the resonant frequency of the vibrations of the vibration unit 830 vibrating in the second direction. At this time, the sensitivity of the vibration unit 830 to sounds of a relatively low frequency range (e.g., below 2000 Hz) in the first direction may be relatively high, and the sensitivity of the vibration unit 830 to sounds of a relatively high frequency range (e.g., above 2000 Hz) in the second direction may be relatively high. The human ears are not sensitive to the sound signal of the relatively high frequency range (e.g., above 2000 Hz), but sensitive to the sound signal of the relatively low frequency range (e.g., below 2000 Hz). The noise signal of the relatively high frequency range in the second direction picked up by the vibration unit may have relatively little interference with the target sound signal picked up in the first direction.

In some embodiments, the response sensitivity of the vibration unit 830 to the vibrations of the housing structure 810 in the second direction may also be reduced by adjusting the size of the mass element 831. For example, the resonant frequency of the vibrations of the vibration unit 830 in the second direction may be within the high frequency range (e.g., above 3000 Hz) by reducing the thickness (or increasing an area of the upper surface or the lower surface of the mass element 831) of the mass element 831 without changing the mass of the mass element 831, thereby reducing the response sensitivity of the vibration unit 830 to the vibrations in the second direction within the target frequency range (e.g., below 3000 Hz). It should be noted that the structure (e.g., the vibration unit 830) of the vibration sensor 800 shown in FIG. 8 is merely a schematic diagram of an exemplary structure of the vibration sensor. The spring structures of the first elastic element 8321 and the second elastic element 8322 in FIG. 8 are merely used to represent that the elastic element 832 has elastic structures, rather than limiting the structural shape of the elastic element 832. More descriptions regarding the specific structure and the positional relationship between the elastic element 832 and the mass element 831 in the vibration sensor 800 may be found in FIGS. 9A-9D and FIGS. 14A-17, and relevant descriptions thereof.

Figure 9A:
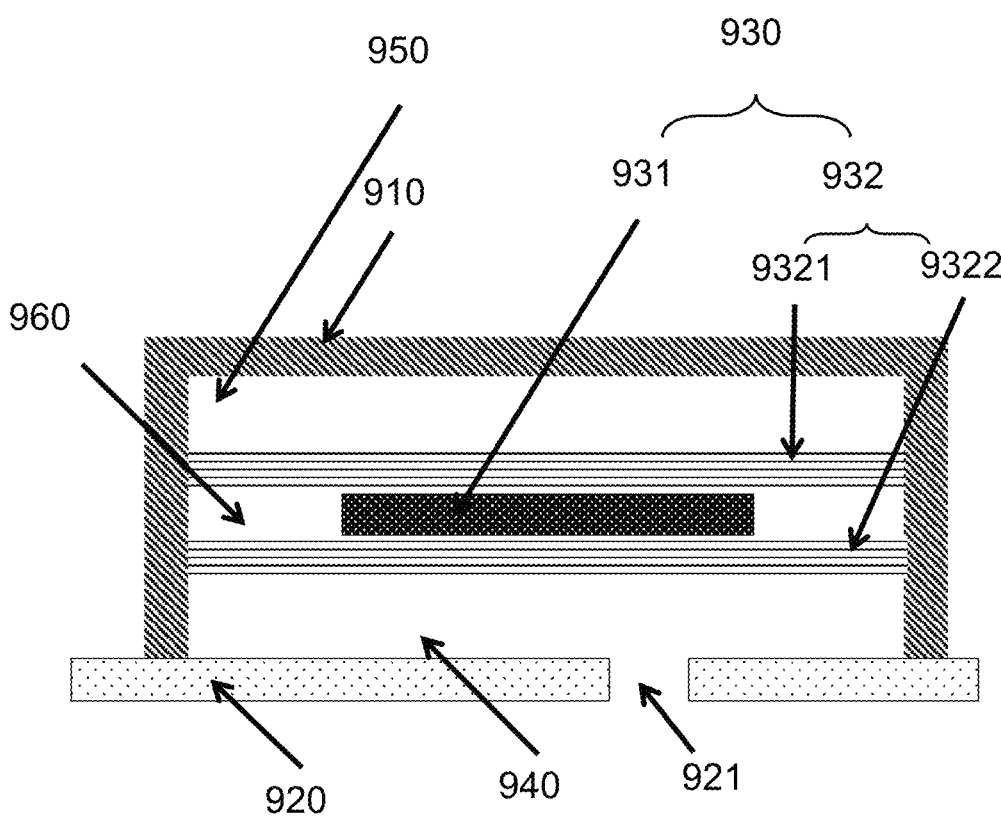
FIG. 9A is a schematic diagram illustrating a structure of a vibration sensor according to some embodiments of the present disclosure.
Figure 9A:
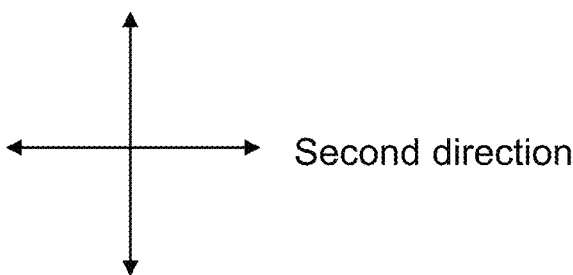

FIG. 9A is a schematic diagram illustrating a structure of a vibration sensor according to some embodiments of the present disclosure. As shown in FIG. 9A, a vibration sensor 900A may include a housing structure 910, an acoustic transducer, and a vibration unit 930. In some embodiments, a shape of the housing structure 910 may be a regular structure (e.g., a cuboid, a cylinder, etc.) or an irregular structure. In some embodiments, the housing structure 910 may be made of a material with a certain hardness, so that the housing structure 910 can protect the vibration sensor 900A and internal components (e.g., the vibration unit 930) thereof. In some embodiments, the material of the housing structure 910 may include a metal, an alloy material, a polymer material, or the like, or any combination thereof. In some embodiments, the housing structure 910 may be connected to a substrate structure 920 on an upper surface of the acoustic transducer. A connection manner may include welding, clamping, bonding, integral molding, or the like, or any combination thereof. In some embodiments, the substrate structure 920 may be a rigid circuit board (e.g., a PCB) or a flexible circuit board (e.g., an FPC). In some embodiments, at least part of the housing structure 910 and the substrate structure 920 on the upper surface of the acoustic transducer may form an acoustic cavity. In some embodiments, the housing structure 910 may independently form a packaging structure with the acoustic cavity. The acoustic transducer may be located in the acoustic cavity of the packaging structure. In some embodiments, the housing structure 910 may a structure that is hollow inside and has an opening at one end. The substrate structure 920 on the upper surface of the acoustic transducer may be physically connected to the opening end of the housing structure 810 for packaging, thereby forming the acoustic cavity. In some embodiments, the vibration unit 930 may be located in the acoustic cavity. The vibration unit 930 may divide the acoustic cavity into a first acoustic cavity 940 and a second acoustic cavity 950. In some embodiments, the first acoustic cavity 940 may be in acoustic communication with the acoustic transducer through a through hole 921 on the substrate structure 920. The second acoustic cavity 950 may be an acoustically sealed cavity structure. It should be noted that the plurality of acoustic cavities obtained by dividing the acoustic cavity through the vibration unit 930 may not be limited to the first acoustic cavity 940 and the second acoustic cavity 950, but may also include more acoustic cavities, e.g., a third acoustic cavity, a fourth acoustic cavity, etc.

In some embodiments, the vibration unit 930 may include a mass element 931 and an elastic element 932. The elastic element 932 may include a first elastic element 9321 and a second elastic element 9322. In some embodiments, the first elastic element 9321 and the second elastic element 9322 may be film structures. In some embodiments, the first elastic element 9321 and the second elastic element 9322 may be approximately symmetrically distributed with respect to the mass element 931 in a first direction. The first elastic element 9321 and the second elastic element 9322 may be connected to the housing structure 910. For example, the first elastic element 9321 may be located on one side of the mass element 931 away from the substrate structure 920, a lower surface of the first elastic element 9321 may be connected to an upper surface of the mass element 931, and a peripheral side of the first elastic element 9321 may be connected to an inner wall of the housing structure 910. The second elastic element 9322 may be located on one side of the mass element 931 facing the substrate structure 920, an upper surface of the second elastic element 9322 may be connected to a lower surface of the mass element 931, and a peripheral side of the second elastic element 9322 may be connected to the inner wall of the housing structure 910. In some embodiments, the first elastic element 9321 or the second elastic element 9322 may also be approximately symmetrically distributed with respect to a centerline of the mass element 931 in the first direction. For example, the first elastic element 9321 may be located between the peripheral side of the mass element 931 and the housing structure 910, the peripheral side of the mass element 931 may be connected to the housing structure 910 through the first elastic element 9321, and the first elastic element 9321 may be approximately symmetrically distributed with respect to the centerline of the mass element 931 in the first direction. The second elastic element 9322 may be connected to the lower surface of the mass element 931, the peripheral side of the second elastic element 9322 may be connected to the housing structure 910, and the second elastic element 9322 may be approximately symmetrically distributed with respect to the centerline of the mass element 931 in the first direction. It should be noted that the film structures of the first elastic element 9321 and the second elastic element 9322 can be regular structures (e.g., rectangles, circles, etc.) or irregular structures, and shapes of the first elastic element 9321 and the second elastic element 9322 can be adaptively adjusted according to a cross-sectional shape of the housing structure 910.

Figure 9B:
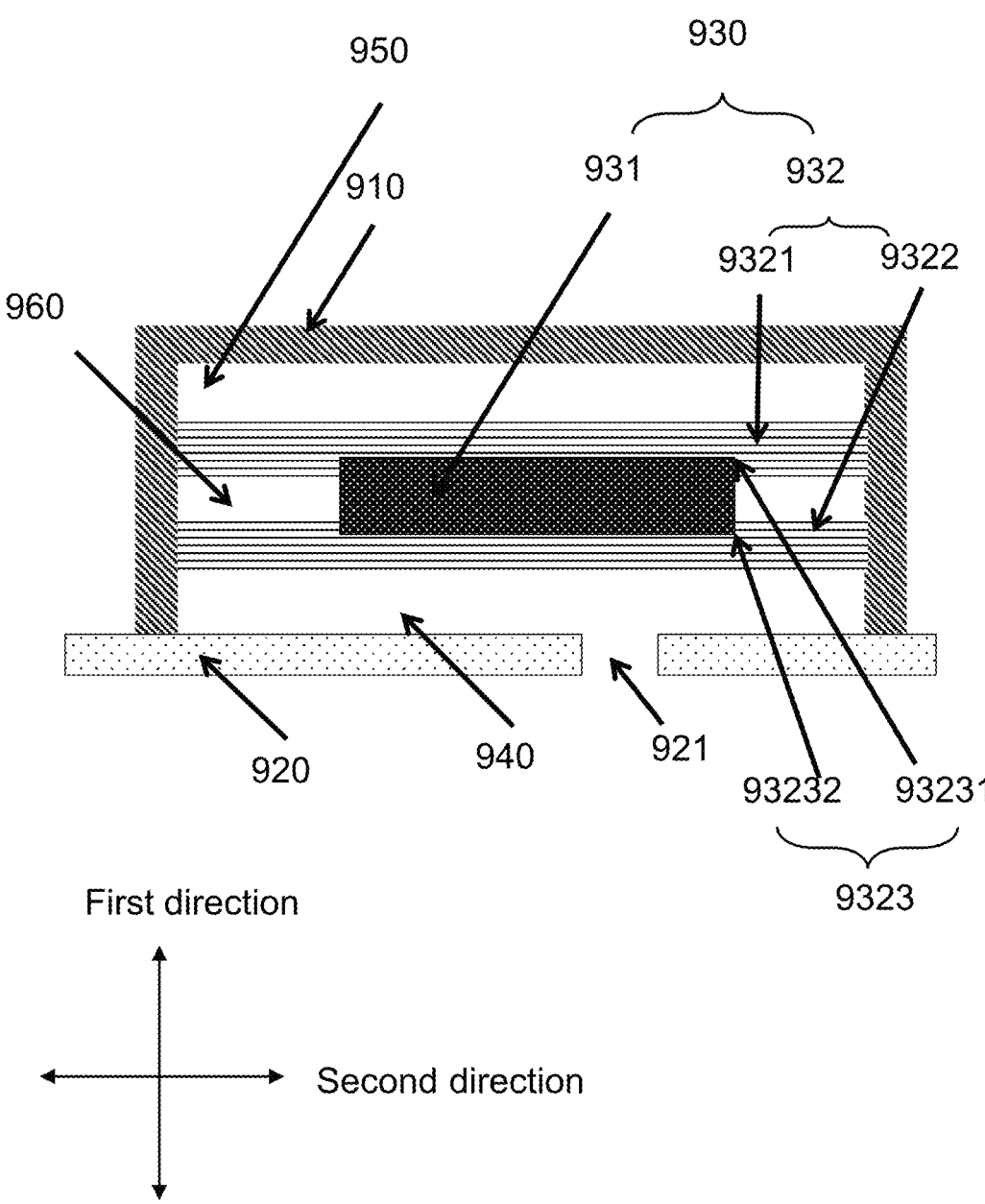
FIG. 9B is a schematic diagram illustrating a structure of a vibration sensor according to some embodiments of the present disclosure.

In some embodiments, the mass element 931 may also be engaged with the elastic element 932. FIG. 9B is a schematic diagram illustrating a structure of a vibration sensor according to some embodiments of the present disclosure. A structure of a vibration sensor 900B shown in FIG. 9B may be substantially the same as a structure of the vibration sensor 900A shown in FIG. 9A. The difference may include that an elastic element 932 shown in FIG. 9B can include a concave region 9323, and the concave region 9323 can be adaptively connected to the elastic element 932. For instance, the first elastic element 9321 may include a first concave region 93231. The first concave region 93231 may be located on one side of the first elastic element 9321 near the upper surface of the mass element 931. The second elastic element 9322 may include a second concave region 93232. The second concave region 93232 may be located on one side of the second elastic element 9322 near the lower surface of the mass element 931. Both ends of the mass element 931 may cooperate with the first concave region 93231 and the second concave region 93232, respectively, thereby realizing engagement of the mass element 931 and the elastic element 932. In some embodiments, a concave depth of the concave region 9323 in the first direction may be set according to requirement(s). For example, the requirement(s) may be a thickness, a mass, etc., of the mass element 931. In some embodiments, a shape of the concave region 9323 may match a shape of the mass element 931. For example, when the mass element 931 is a cylindrical structure, the shape of the concave region 9323 may also be a cylindrical structure. Both ends of the cylindrical structure of the mass element 931 may cooperate with the cylindrical structures of the first concave region 93231 and the second concave region 93232, respectively, thereby realizing the engagement of the mass element 931 and the elastic element 932. By setting the concave region 9323 in the elastic element 932, the thickness and the mass of the mass element 931 may be adjusted without changing volumes of the first acoustic cavity 940 and the second acoustic cavity 950.

In some embodiments, when the first elastic element 9321 and the second elastic element 9322 are the film structures, a size of the upper surface or the lower surface of the mass element 931 may be less than a size of the first elastic element 9321 and the second elastic element 9322, and a side surface of the mass element 931 and an inner wall of the housing structure 910 may form a ring or a rectangle with equal spacing distances.

Figure 9C:
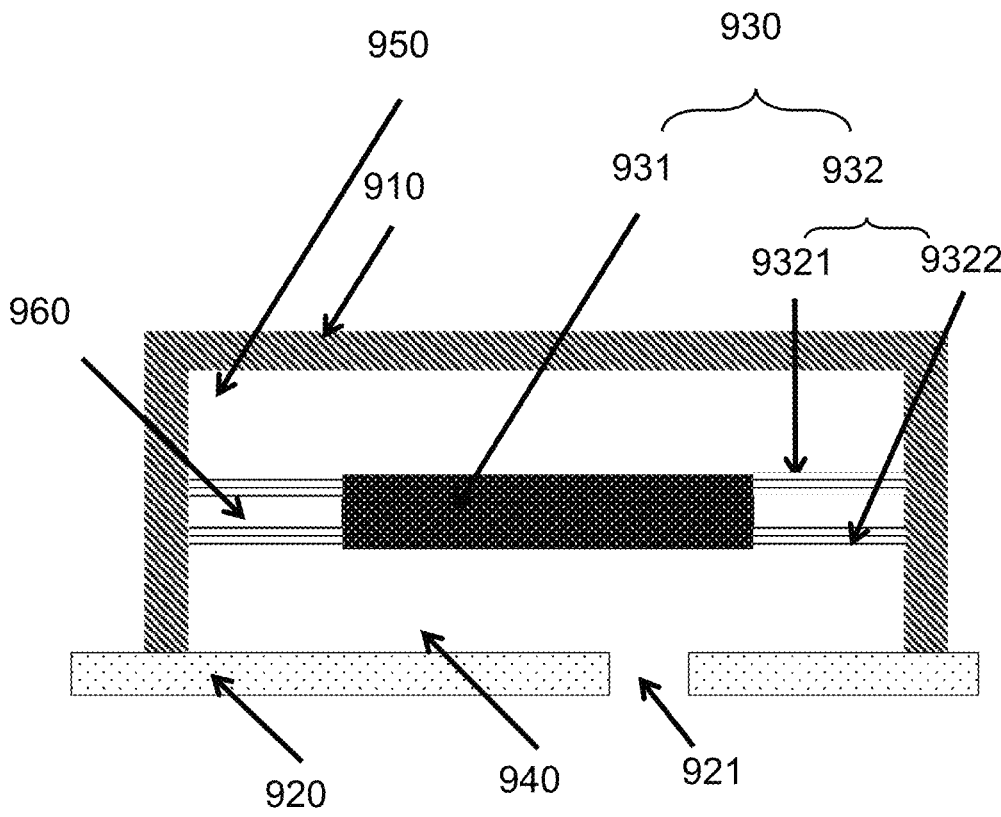
FIG. 9C is a schematic diagram illustrating a structure of a vibration sensor according to some embodiments of the present disclosure.
Figure 9C:
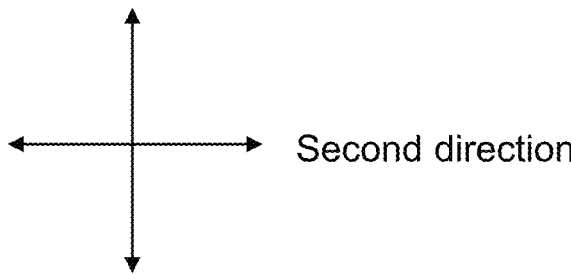

FIG. 9C is a schematic diagram illustrating a structure of a vibration sensor according to some embodiments of the present disclosure. An overall structure of a vibration sensor 900C shown in FIG. 9C may be substantially the same as the overall structure of the vibration sensor 900A shown in FIG. 9A. The main difference may include a position and a connection relationship between an elastic element and a mass element. As shown in FIG. 9C, the first elastic element 9321 and the second elastic element 9322 may be located between the peripheral side of the mass element 931 and the housing structure 910, and the peripheral side of the mass element 931 may be connected to the housing structure 910 through the first elastic element 9321 and the second elastic element 9322. In some embodiments, taking the mass element 931 being the cylindrical structure as an example, the elastic element 932 (e.g., the first elastic element 9321 and the second elastic element 9322) may be a ring film structure or a ring structure, and the elastic element 932 may sleeve the peripheral side of the mass element 931 and may be located between the peripheral side of the mass element 931 and the housing structure 910. An inner side of the ring film structure or the ring structure may be connected to the peripheral side of the mass element 931 in a surrounding manner, and an outer side of the ring film structure or the ring structure may be connected to the inner wall of the housing structure 910 in a surrounding manner. In some embodiments, the shape and the structure of the elastic element 932 may be adaptively adjusted according to the shapes and the structures of the mass element 931 and the housing structure 910. For example, when the mass element 931 is a square columnar structure, the elastic element 932 may correspondingly be a square ring film structure. An inner side of the square ring film structure may be connected to the peripheral side of the mass element 931 in a surrounding manner, and an outer side of the square ring film structure may be connected to the inner wall of the housing structure 910 in a surrounding manner. In such arrangement, the volumes of the first acoustic cavity 940 and the second acoustic cavity 950 may be increased without changing the size (e.g., the thickness) of the mass element 931, thereby improving the response sensitivity of the vibration sensor 900.

In some embodiments, the thickness of the mass element 931 may be within a range of 10 μm to 1000 μm. In some embodiments, the thickness of the mass element 931 may be within a range of 6 μm to 500 μm. In some embodiments, the thickness of the mass element 931 may be within a range of 800 μm to 1400 μm. In some embodiments, the thicknesses of the first elastic element 9321 and the second elastic element 9322 may be within a range of 0.1 μm to 500 μm. In some embodiments, the thicknesses of the first elastic element 9321 and the second elastic element 9322 may be within a range of 0.05 μm to 200 μm. In some embodiments, the thicknesses of the first elastic element 9321 and the second elastic element 9322 may be within a range of 300 μm to 800 μm. In some embodiments, a thickness ratio of each elastic element (e.g., the first elastic element 9321 or the second elastic element 9322) to the mass element 931 may be within a range of 2 to 100. In some embodiments, the thickness ratio of each elastic element to the mass element 931 may be within a range of 10-50. In some embodiments, the thickness ratio of each elastic element to the mass element 931 may be within a range of 20 to 40. In some embodiments, a thickness difference between the mass element 931 and each elastic element (e.g., the first elastic element 9321 or the second elastic element 9322) may be within a range of 9 μm to 500 μm. In some embodiments, the thickness difference between the mass element 931 and each elastic element may be within a range of 50 μm to 400 μm. In some embodiments, the thickness difference between the mass element 931 and each elastic element may be within a range of 100 μm to 300 μm.

In some embodiments, a gap 960 may be formed between the first elastic element 9321, the second elastic element 9322, the mass element 931, and the housing structure 910 or the acoustic transducer corresponding to the acoustic cavity. As shown in FIGS. 9A-9C, in some embodiments, the gap 960 may be located on the peripheral side of the mass element 931. When the mass element 931 responds to an external vibration signal and the mass element 931 generates the vibrations with respect to the housing structure 910, the gap 960 may prevent the mass element 931 from colliding with the housing structure 910 during the vibrations. In some embodiments, the gap 960 may include a filler. A quality factor of the vibration sensor (e.g., the vibration sensor 900A, the vibration sensor 900B, the vibration sensor 900C) may be adjusted by disposing the filler in the gap 960. In some embodiments, filling in the gap 960 with the filler may make the quality factor of the vibration sensor 900 be within a range of 0.7 to 10. In some embodiments, filling in the gap 960 with the filler may make the quality factor of the vibration sensor 900 be within a range of 1 to 5. In some embodiments, the filler may be gas, liquid (e.g., silicone oil), an elastic material, or the like, or any combination thereof. Exemplary gases may include air, argon, nitrogen, carbon dioxide, or the like, or any combination thereof. Exemplary elastic materials may include silicone gel, silicone rubber, or the like, or any combination thereof.

In some embodiments, a volume of an acoustic cavity (e.g., the second acoustic cavity 950) formed between the first elastic element 9321 and the housing structure 910 corresponding to the acoustic cavity may be larger than or equal to a volume of the first acoustic cavity 940 formed between the second elastic element 9322, and the housing structure 910 and the substrate structure 920 corresponding to the acoustic cavity, so that the volume of the first acoustic cavity 940 is equal to or approximately equal to the volume of the second acoustic cavity 950, thereby improving a symmetry of the vibration sensor 900. For instance, there is air inside the first acoustic cavity 940 and the second acoustic cavity 950. When the vibration unit 930 generates the vibrations with respect to the housing, the vibration unit 930 may compress the air inside the two acoustic cavities. Therefore, the first acoustic cavity 940 and the second acoustic cavity 950 may be approximately regarded as two air springs. The volume of the second acoustic cavity 950 may be larger than or equal to the volume of the first acoustic cavity 940, so that coefficients of the air springs brought by the compressed air in the vibration unit 930 is approximately equal, thereby further improving the symmetry of the elastic elements (including the air springs) on the upper and lower sides of the mass element 931. In some embodiments, the volume of the first acoustic cavity 940 and the volume of the second acoustic cavity 950 may be within a range of 10 μm³ to 1000 μm³. In some embodiments, the volume of the first acoustic cavity 940 and the volume of the second acoustic cavity 950 may be within a range of 50 μm³ to 500 μm³.

Figure 9D:
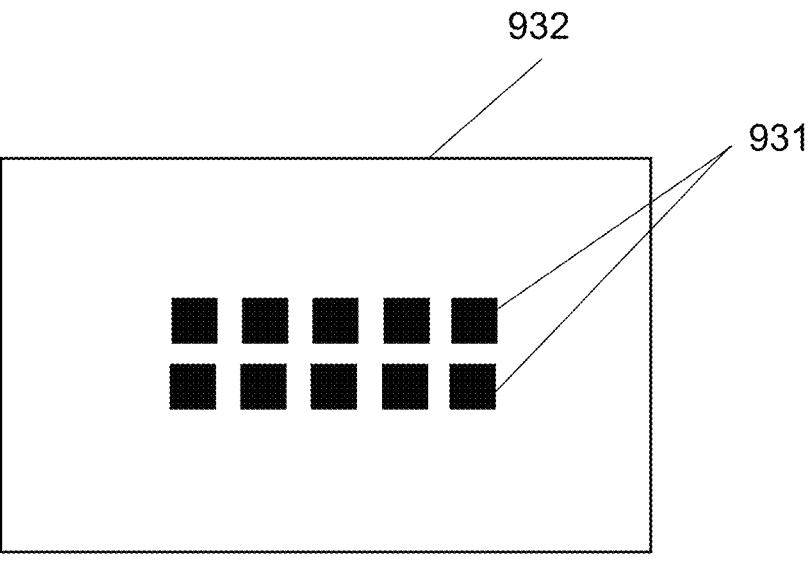
FIG. 9D is a schematic diagram illustrating an exemplary distribution of mass elements according to some embodiments of the present disclosure.

FIG. 9D is a schematic diagram illustrating an exemplary distribution of mass elements according to some embodiments of the present disclosure. In some embodiments, each mass element 931 may include a plurality of sub-mass elements arranged in an array. The plurality of sub-mass elements may be arranged in an array on a surface of the elastic element 932. For example, when the elastic element 932 is the film structure, the mass elements 931 may be arranged in an array at a center of the surface of the elastic element 932. In some embodiments, when the plurality of sub-mass elements are arranged in an array, a centroid of the mass element 931 may be a geometric center of an array shape formed by the plurality of sub-mass elements. The centroid of the mass element 931 may be related to a shape structure and a size of the array shape formed by the plurality of sub-mass elements. For example, when the array shape is a rectangular plate structure, the centroid of the mass element 931 may be located at an intersection of two diagonal lines of the rectangular plate structure. In some embodiments, a whole structure of the mass element 931 may be approximately regarded as a structure with a uniform density. At this time, the centroid of the mass element 931 may be approximately regarded as a center of gravity of the mass element 931. In some embodiments, when the mass elements 931 are distributed in an array, a count and/or the shape, an array spacing (i.e., a distance between two adjacent sub-mass elements), the array shape (e.g., a rectangle, a circle, etc.), etc., of the sub-mass elements may be reasonably set according to actual requirement(s), which are not limited herein. By setting the mass elements 931 in an array and setting array parameters (e.g., the count and/or the shape, the array spacing, the array shape, etc., of the sub-mass elements), the vibration unit 930 may be reasonably adjusted. For example, a mass of the mass element 931 may be reasonably adjusted without changing a thickness of the mass element 931.

Figure 10:
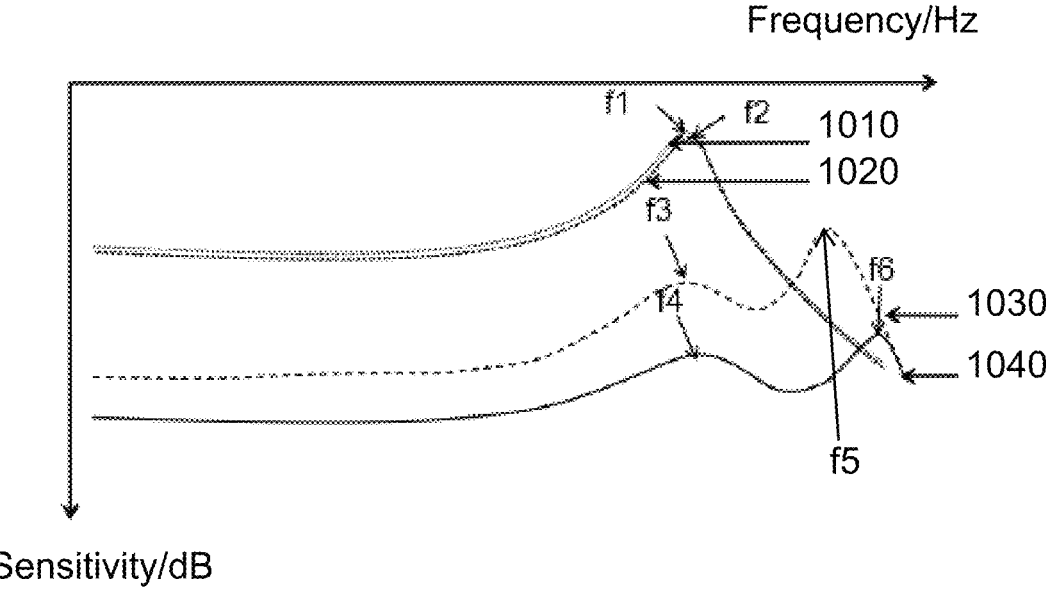
FIG. 10 is a schematic diagram illustrating a frequency response curve of a vibration sensor according to some embodiments of the present disclosure.

FIG. 10 is a schematic diagram illustrating a frequency response curve of a vibration sensor according to some embodiments of the present disclosure. As shown in FIG. 10, a horizontal axis represents a frequency, and a unit of the horizontal axis is Hz. A vertical axis represents a sensitivity of the vibration sensor, and a unit of the vertical axis is dB. A curve 1010 represents a sensitivity of a vibration sensor (e.g., the vibration sensor 300 in FIG. 3) including one elastic element in a first direction. A curve 1020 represents a sensitivity of a vibration sensor including two approximately symmetrical elastic elements (e.g., the first elastic element 9321 and the second elastic element 9322 shown in FIG. 9A) in the first direction. A curve 1030 represents a sensitivity of a vibration sensor (e.g., the vibration sensor 300 in FIG. 3) including one elastic element in a second direction. A curve 1040 represents a sensitivity of a vibration sensor including two approximately symmetrical elastic elements (e.g., the first elastic element 9321 and the second elastic element 9322 shown in FIG. 9A) in the second direction. A material and a shape of the elastic element of the vibration sensor corresponding to the curve 1010 (or the curve 1030) may be the same as materials and shapes of the two elastic elements of the vibration sensor corresponding to the curve 1020 (or the curve 1040). The difference may include that a thickness of the elastic element of the vibration sensor corresponding to the curve 1010 (or the curve 1030) is approximately equal to a total thickness of the two elastic elements of the vibration sensor corresponding to the curve 1020 (or the curve 1040). It should be noted that an approximate error does not exceed 50%.

It can be seen that by comparing the curve 1010 and the curve 1020, the sensitivity (the curve 1010 in FIG. 10) of the vibration sensor including one elastic element in the first direction is approximately equal to the sensitivity (the curve 1020 in FIG. 10) of the vibration sensor including two approximately symmetrical elastic elements in the first direction within a specific frequency range (e.g., below 3000 Hz). It can also be understood that a count and a distribution of the elastic elements included in the vibration sensor may have less influence on the sensitivity of the vibration sensor in the first direction within the specific frequency range (e.g., below 3000 Hz). In addition, in the curve 1010 and the curve 1020, f1 is a resonant frequency of a resonant peak of the vibration sensor including one elastic element in the first direction, and f2 is a resonant frequency of a resonant peak of the vibration sensor including two approximately symmetrical elastic elements in the first direction. The resonant frequency f1 of the resonant peak of the vibration sensor including one elastic element in the first direction is approximately equal to the resonant frequency f2 of the resonant peak of the vibration sensor including two approximately symmetrical elastic elements in the first direction. That is, the sensitivity of the vibration sensor including one elastic element in the first direction is approximately equal to the sensitivity of the vibration sensor including two approximately symmetrical elastic elements in the first direction within the specific frequency range. Considering that the vibration sensor is a non-ideal device, the resonant frequency of the vibration sensor in the first direction has a mapping (also referred to as a component) in the second direction. Correspondingly, in the curve 1030, f3 is used to represent a mapping of the resonant frequency of the vibration sensor including one elastic element in the first direction in a frequency response curve of the second direction (also referred to as a component of the resonant frequency of the first direction in the frequency response curve of the second direction). f5 is a resonant frequency of the vibration sensor including one elastic element in the second direction. In the curve 1040, f4 is used to represent a mapping of a resonant frequency of the first direction of the vibration sensor including two elastic elements in the frequency response curve of the second direction. f6 is a resonant frequency of the vibration sensor including two approximately symmetrical elastic elements in the second direction. Due to a mapping relationship, the resonant frequency f3 in the third curve 1030 is approximately equal to the resonant frequency f1 in the first curve 1010, and the resonant frequency f4 in the fourth curve 1040 is approximately equal to the resonant frequency f2 in the second curve 1020. It can be seen that by comparing the curve 1030 and the curve 1040, the sensitivity (the curve 1030 in FIG. 10) of the vibration sensor including one elastic element in the second direction is larger than the sensitivity (the curve 1040 in FIG. 10) of the vibration sensor including two approximately symmetrical elastic elements in the second direction within a specific frequency range (e.g., below 3000 Hz). It can also be understood that the count and the distribution of the elastic elements included in the vibration sensor have a great impact on the sensitivity of the vibration sensor in the second direction within the specific frequency range (e.g., below 3000 Hz). In addition, it can be seen that by combining the curve 1030 and the curve 1040, when f1 and f2 are approximately equal (or f3 and f4 are approximately equal), the resonant frequency f5 corresponding to the resonant peak of the vibration sensor including one elastic element in the second direction is significantly less than the resonant frequency f6 corresponding to the resonant peak of the vibration sensor including two approximately symmetrical elastic elements in the second direction within the specific frequency range (e.g., below 3000 Hz). In some embodiments, by disposing two approximately symmetrical elastic elements in the vibration sensor, the resonant frequency of the resonant peak of the vibration sensor in the second direction may be located within a higher frequency range, thereby reducing the sensitivity of the vibration sensor in a low and mid frequency range away from the resonant frequency. Further, the sensitivity (the curve 1040 in FIG. 10) of the vibration sensor including two approximately symmetrical elastic elements in the second direction is flatter than the sensitivity (the curve 1030 in FIG. 10) of the vibration sensor including one elastic element in the second direction within the specific frequency range (3000 Hz).

It can be known from the curve analysis that by setting the first elastic element and the second elastic element that are approximately symmetrical in the vibration sensor, a difference between the sensitivity of the vibration sensor in the second direction and the sensitivity of the vibration sensor in the first direction may be increased within the specific frequency range (e.g., below 3000 Hz), on the premise of reducing the sensitivity of the vibration sensor in the second direction without substantially changing the sensitivity of the vibration sensor in the first direction, thereby improving the direction selectivity of the vibration sensor, and enhancing the anti-noise interference ability of the vibration sensor. In some embodiments, in order to further reduce the sensitivity in the second direction, a ratio of the resonant frequency f6 corresponding to the resonant peak of the vibration sensor including two approximately symmetrical elastic elements in the second direction to the resonant frequency f5 corresponding to the resonant peak of the vibration sensor including one elastic element in the second direction within the specific frequency range (e.g., below 3000 Hz) may be larger than 2. In some embodiments, the ratio of the resonant frequency f6 corresponding to the resonant peak of the vibration sensor including two approximately symmetrical elastic elements in the second direction to the resonant frequency f5 corresponding to the resonant peak of the vibration sensor including one elastic element in the second direction within the specific frequency range (e.g., below 3000 Hz) may be larger than 3.5. In some embodiments, the ratio of the resonant frequency f6 corresponding to the resonant peak of the vibration sensor including two approximately symmetrical elastic elements in the second direction to the resonant frequency f5 corresponding to the resonant peak of the vibration sensor including one elastic element in the second direction within the specific frequency range (e.g., below 3000 Hz) may be larger than 5. In some embodiments, a ratio of the resonant frequency f6 corresponding to the resonant peak of the vibration sensor including two approximately symmetrical elastic elements in the second direction to the resonant frequency f2 corresponding to the resonant peak of the vibration sensor including two approximately symmetrical elastic elements in the first direction may be larger than 1. In some embodiments, the ratio of the resonant frequency f6 corresponding to the resonant peak of the vibration sensor including two approximately symmetrical elastic elements in the second direction to the resonant frequency f2 corresponding to the resonant peak of the vibration sensor including two approximately symmetrical elastic elements in the first direction may be larger than 1.5. In some embodiments, the ratio of the resonant frequency f6 corresponding to the resonant peak of the vibration sensor including two approximately symmetrical elastic elements in the second direction to the resonant frequency f2 corresponding to the resonant peak of the vibration sensor including two approximately symmetrical elastic elements in the first direction may be larger than 2.

Figure 11:
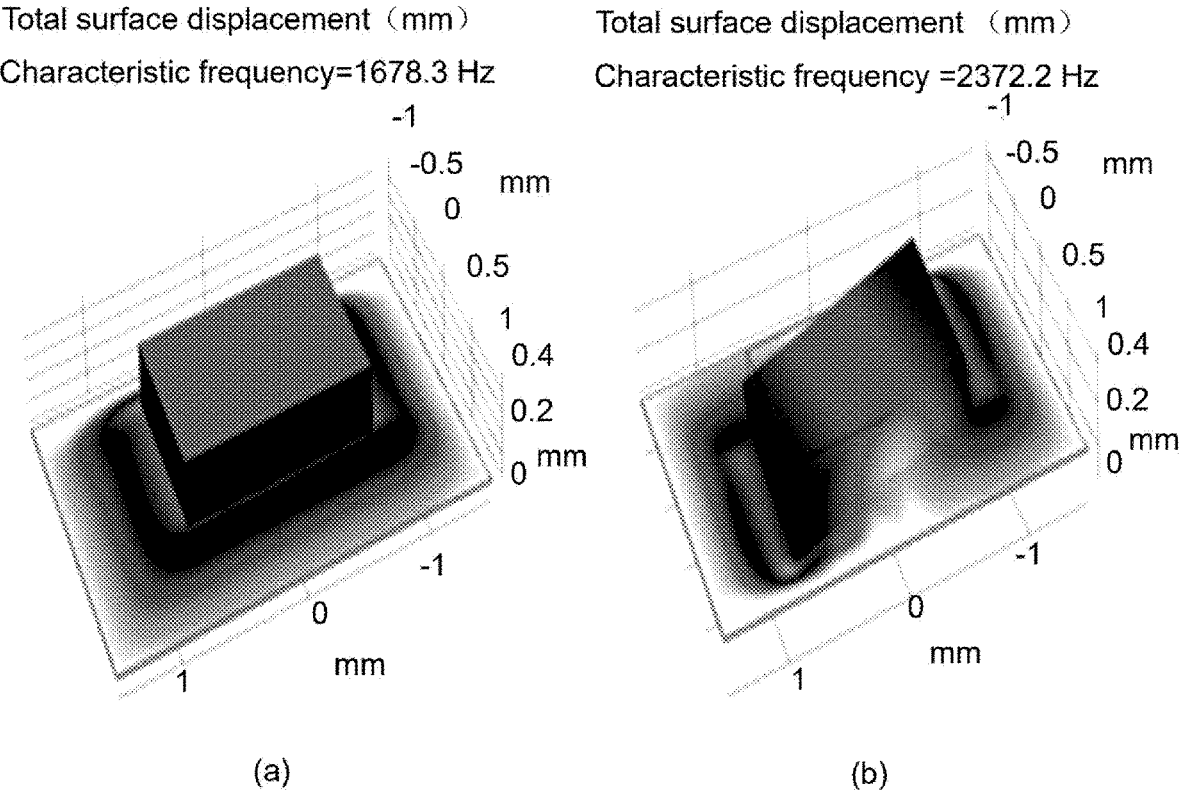
FIG. 11 is a schematic diagram illustrating a dynamic simulation of a vibration sensor according to some embodiments of the present disclosure.
Figure 12:
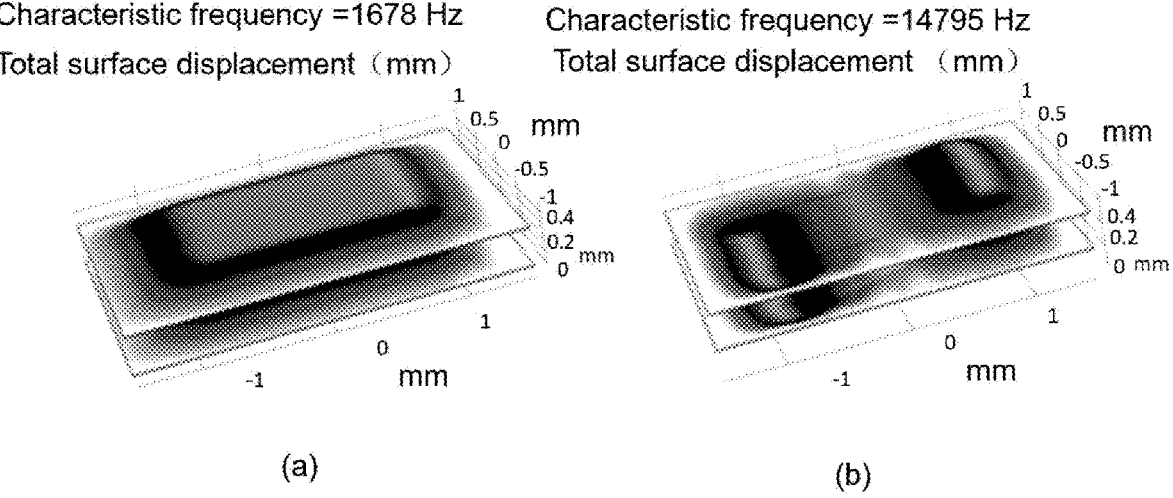
FIG. 12 is a schematic diagram illustrating a dynamic simulation of a vibration sensor according to some embodiments of the present disclosure.

FIG. 11 is a schematic diagram illustrating a dynamic simulation of a vibration sensor according to some embodiments of the present disclosure. FIG. 12 is a schematic diagram illustrating a dynamic simulation of a vibration sensor according to some embodiments of the present disclosure. A portion (a) in FIG. 11 illustrates a vibration displacement of a mass element of a vibration sensor including one elastic element, wherein a resonant frequency of the vibration sensor in a first direction may be 1678.3 Hz. A portion (b) in FIG. 11 illustrates a vibration displacement of the mass element of the vibration sensor including one elastic element in a second direction, wherein a resonant frequency of the vibration sensor in the second direction may be 2372.2 Hz. A portion (a) in FIG. 12 illustrates a vibration displacement of the mass element of a vibration sensor including two approximately symmetrical elastic elements in the first direction, wherein a resonant frequency of the vibration sensor in the first direction may be 1678 Hz. A portion (b) in FIG. 12 illustrates a vibration displacement of the mass element of the vibration sensor including two approximately symmetrical elastic elements in the second direction, wherein a resonant frequency of the vibration sensor in the second direction may be 14795 Hz. It should be noted that in FIG. 11 and FIG. 12, except for thicknesses of the elastic elements, lengths and widths of the elastic elements, and lengths, widths, and thicknesses of the mass elements may be the same.

Referring to FIG. 11, the resonant frequency (1678.3 Hz) of the vibration sensor including one elastic element in the first direction and the resonant frequency (2372.2 Hz) of the vibration sensor including one elastic element in the second direction may be both within a target frequency range (e.g., 0 Hz-3000 Hz). Therefore, a vibration signal of the mass element in the second direction may have a great influence on an electrical signal finally output by the vibration sensor. Referring to FIG. 12, the resonant frequency (1678 Hz) of the vibration sensor including two approximately symmetrical elastic elements in the first direction may be within the target frequency range (e.g., 0 Hz-3000 Hz), and the resonant frequency (14795 Hz) of the vibration sensor including two approximately symmetrical elastic elements in the second direction may be much higher than a target frequency. Therefore, a vibration signal of the mass element in the second direction may have less influence on the electrical signal finally output by the vibration sensor.

In some embodiments, the displacement of the mass element may be related to the resonant frequency of the vibration sensor in the first direction and/or the second direction. For instance, the displacement of the mass element may be inversely proportional to the square of the resonant frequency of the vibration sensor in the first direction and/or the second direction. That is, the higher the resonant frequency of the vibration sensor in the first direction and/or the second direction, the less the displacement of the mass element in the first direction and/or the second direction. In some embodiments, the less the displacement of the mass element in the first direction and/or the second direction, the less the influence on the electrical signal output by the vibration sensor. Therefore, in order to reduce the influence of the vibration signal of the mass element in the second direction on the electrical signal output by the vibration sensor, the displacement of the mass element in the second direction may be reduced. That is, the resonant frequency of the vibration sensor in the second direction may be increased. Comparing FIG. 11 and FIG. 12, the displacement of the mass element of the vibration sensor in the second direction in FIG. 12 may be less than the displacement of the mass element of the vibration sensor in the second direction in FIG. 11. Therefore, a sensitivity of the vibration sensor in the second direction in FIG. 12 may be lower than a sensitivity of the vibration sensor in the second direction in FIG. 11. That is, by setting the two elastic elements that are approximately symmetrical in the vibration sensor, the sensitivity of the vibration sensor in the second direction may be reduced, thereby improving a direction selectivity of the vibration sensor, and enhancing the anti-noise interference ability of the vibration sensor.

In some embodiments, the resonant frequencies of the vibration sensor in the first direction and the second direction may be adjusted by adjusting a size (e.g., a length and a width) of the mass element. In some embodiments, a ratio of the resonant frequency of the vibration sensor in the second direction to the resonant frequency of the vibration sensor in the first direction may be changed by adjusting the size (e.g., the length and the width) of the mass element. In some embodiments, the ratio of the vibration frequency of the vibration sensor in the second direction to the vibration frequency of the vibration sensor in the first direction may be within a range of 1 to 2.5. In some embodiments, the ratio of the vibration frequency of the vibration sensor in the second direction to the vibration frequency of the vibration sensor in the first direction may be within a range of 1.3 to 2.2. In some embodiments, the ratio of the vibration frequency of the vibration sensor in the second direction to the vibration frequency of the vibration sensor in the first direction may be within a range of 1.5 to 2. More descriptions regarding adjusting the resonant frequency of the vibration sensor in the first direction, the resonant frequency of the vibration sensor in the second direction, and the ratio thereof by adjusting the size of the mass element may be found in FIG. 13 and the relevant descriptions thereof.

Figure 13:
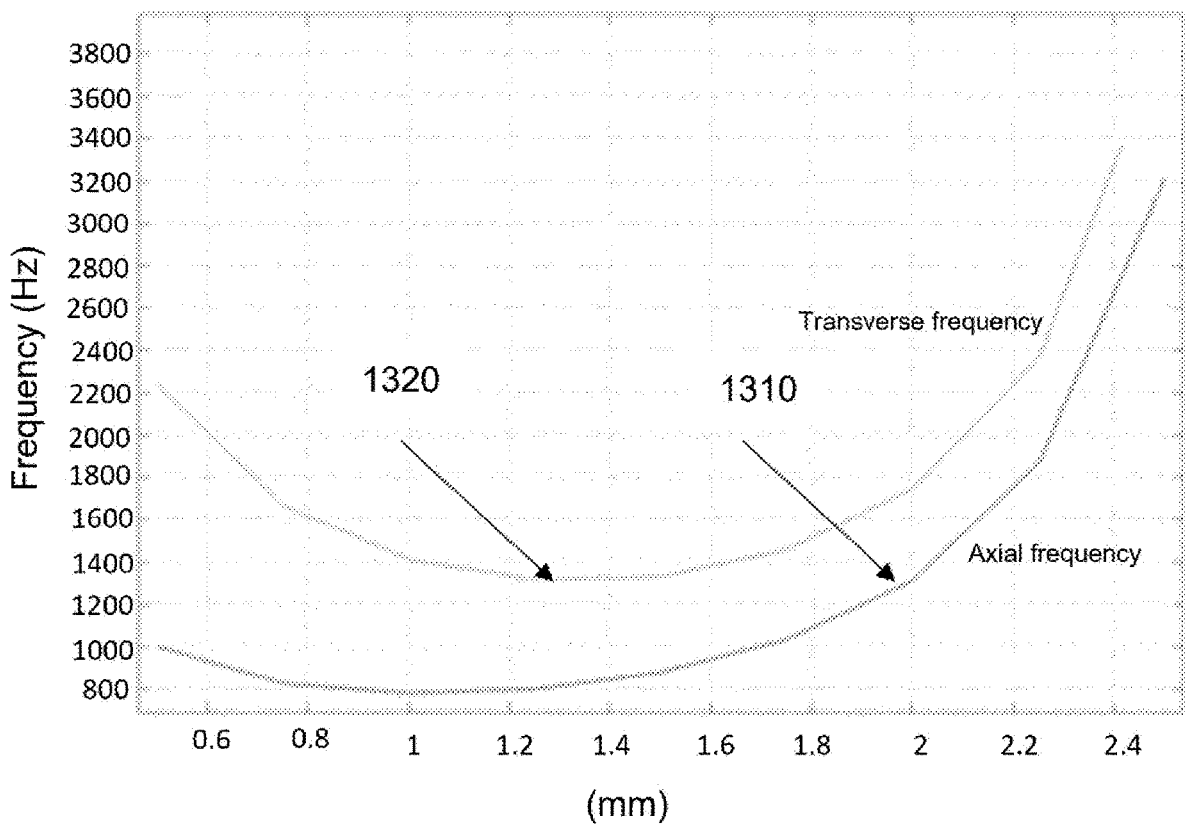
FIG. 13 is a schematic diagram illustrating a resonant frequency of a vibration unit according to some embodiments of the present disclosure.

FIG. 13 is a schematic diagram illustrating a resonant frequency of a vibration unit according to some embodiments of the present disclosure. As shown in FIG. 13, a horizontal axis represents a length of a mass element, and a unit of the horizontal axis is millimeter (mm). A vertical axis represents frequencies corresponding to mass elements of different lengths, and a unit of the vertical axis is Hz. The vibration sensor 300 in FIG. 3 is taken as an example for illustration. A width and a thickness of the mass element 3201 of the vibration unit 320 may be 1.5 mm and 0.3 mm, respectively. A length, a width, and a thickness of the elastic element 3202 of the vibration unit 320 may be 3 mm, 2 mm, and 0.01 mm, respectively. The curve 1310 represents a resonant frequency of the vibration sensor 300 in the first direction, and the curve 1320 represents a resonant frequency of the vibration sensor 300 in the second direction. Referring to the curve 1310 in FIG. 13, when the length of the mass element 3201 is within a range of 0.6 mm to 0.8 mm, the resonant frequency of the vibration sensor 300 in the first direction may decrease as the length of the mass element 3201 increases. Referring to the curve 1320 in FIG. 13, when the length of the mass element 3201 is within a range of 0.6 mm to 1.2 mm, the resonant frequency of the vibration sensor 300 in the second direction may decrease as the length of the mass element 931 increases. When the length of the mass element 3201 is within a range of 1.2 mm to 2.4 mm, the resonant frequency of the vibration sensor 300 in the first direction may increase as the length of the mass element 3201 increases. When the length of the mass element 3201 is within a range of 1.4 mm to 2.4 mm, the resonant frequency of the vibration sensor 300 in the second direction may increase as the length of the mass element 3201 increases. In some embodiments, a ratio of the resonant frequency of the vibration sensor 300 in the second direction to the resonant frequency of the vibration sensor 300 in the first direction may change with the length of the mass element 3201. That is, the ratio (also referred to as a relative transverse sensitivity) of the resonant frequency of the vibration sensor 300 in the second direction to the resonant frequency of the vibration sensor 300 in the first direction is changed by adjusting the size (e.g., the length and the width) of the mass element 3201. In some embodiments, the ratio of the resonant frequency of the vibration sensor in the second direction to the resonant frequency of the vibration sensor in the first direction may be within a range of 1 to 2.5. In some embodiments, the ratio of the resonant frequency of the vibration sensor in the second direction to the resonant frequency of the vibration sensor in the first direction may be within a range of 1.5 to 2.5. In some embodiments, the ratio of the resonant frequency of the vibration sensor in the second direction to the resonant frequency of the vibration sensor in the first direction may be larger than 2. For example, in FIG. 13, when the length of the mass element 3201 is about 0.2 mm, the resonant frequency of the vibration sensor 300 in the second direction may be about 2200 Hz, the resonant frequency of the vibration sensor 300 in the first direction may be about 1000 Hz, and the ratio of the resonant frequency of the vibration sensor 300 in the second direction to the resonant frequency of the vibration sensor 300 in the first direction may be about 2.2. Further, when the length of the mass element 3201 is about 0.8 mm, the resonant frequency of the vibration sensor 300 in the second direction may be about 2000 Hz, the resonant frequency of the vibration sensor 300 in the first direction may be about 800 Hz, and the ratio of the resonant frequency of the vibration sensor 300 in the second direction to the resonant frequency of the vibration sensor 300 in the first direction may be about 2.

The ratio of the resonant frequency of the vibration sensor in the second direction to the resonant frequency of the vibration sensor in the first direction may change by changing the size (the length or the width) of the mass element, and a mass of the mass element and a stiffness of the elastic element may also change, thereby affecting the resonant frequency of the vibration sensor in the second direction and the resonant frequency of the vibration sensor in the first direction. In some embodiments, in order to reduce the sensitivity of the vibration sensor in the second direction within the target frequency range while ensuring that the sensitivity of the vibration sensor in the first direction does not change significantly, the ratio of the size (e.g., the length or the width) of the mass element may be within a range of 0.2 to 0.9. In some embodiments, the ratio of the size of the mass element to the size of the elastic element may be within a range of 0.3 to 0.7. In some embodiments, the ratio of the size of the mass element to the size of the elastic element may be within a range of 0.5 to 0.7. Merely by way of example, the size (e.g., the length or the width) of the mass element may be ½ of the size of the elastic element. As another example, the size (e.g., the length or the width) of the mass element may be ¾ of the size of the elastic element.

Figure 14A:
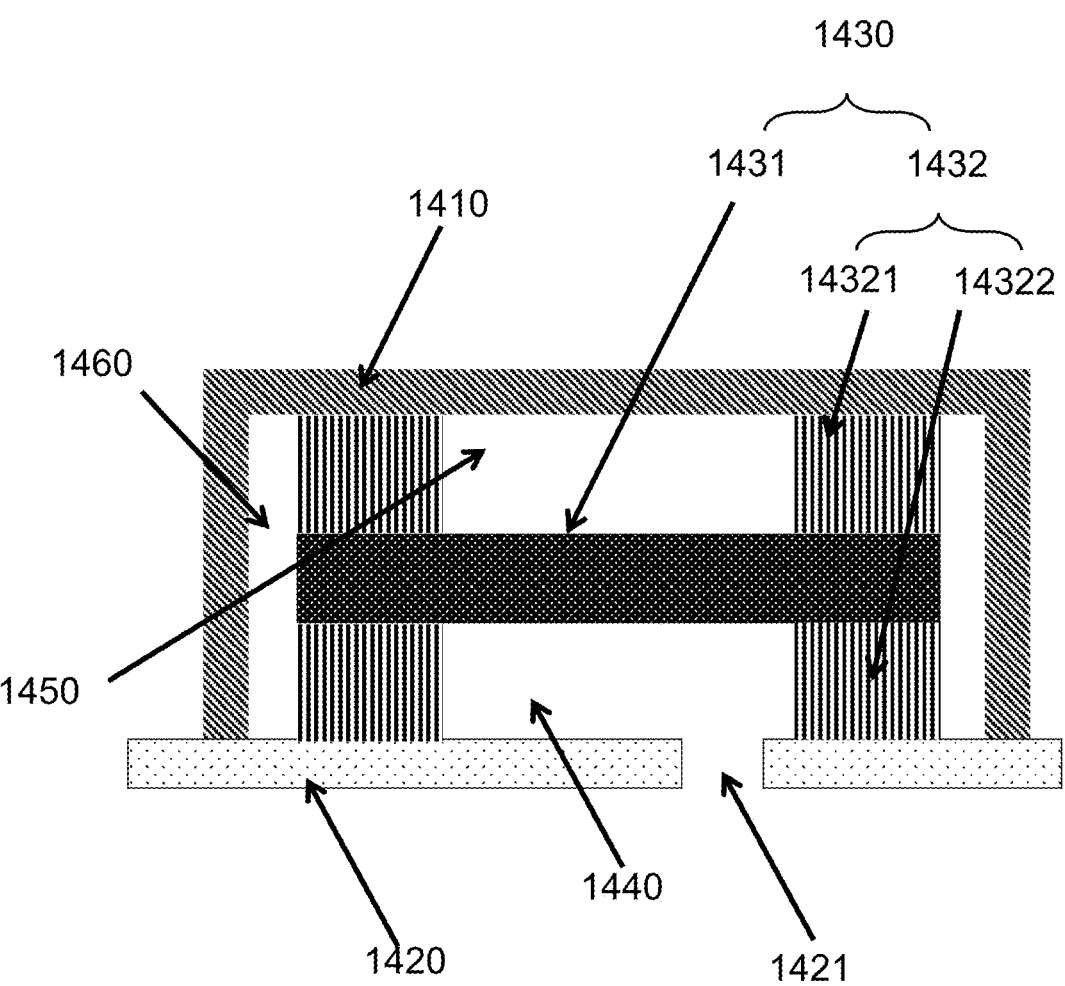
FIG. 14A is a schematic diagram illustrating a structure of a vibration sensor according to some embodiments of the present disclosure.
Figure 14A:
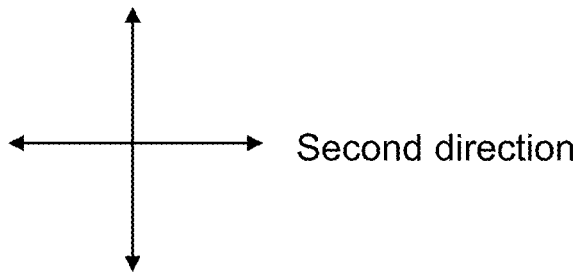

FIG. 14A is a schematic diagram illustrating a structure of a vibration sensor according to some embodiments of the present disclosure. As shown in FIG. 14A, a vibration sensor 1400A may include a housing structure 1410, an acoustic transducer, and a vibration unit 1430. The vibration sensor 1400A shown in FIG. 14A may be the same as or similar to the vibration sensor 900A shown in FIG. 9A. For example, a housing structure 1410 of the vibration sensor 1400A may be the same as or similar to the housing structure 910 of the vibration sensor 900A. As another example, a first acoustic cavity 1440 of the vibration sensor 1400A may be the same as or similar to the first acoustic cavity 940 of the vibration sensor 900A. As still another example, a substrate structure 1420 of the vibration sensor 1400A may be the same as or similar to the substrate structure 920 of the vibration sensor 900A. More descriptions regarding more structures (e.g., a second acoustic cavity 1450, a through hole 1421, a mass element 1431, etc.) of the vibration sensor 1400A may be found in FIG. 9A and the relevant descriptions thereof.

In some embodiments, the main difference between the vibration sensor shown in FIG. 14A and the vibration sensor 900A shown in FIG. 9A may include that each of a first elastic element 14321 and a second elastic element 14322 of the vibration sensor 1400A is a columnar structure with a hollow region in a middle portion. The first elastic element 14321 and the second elastic element 14322 may respectively extend along a thickness direction of the mass element 1431 and may be connected to the housing structure 1410 or the substrate structure 1420 on an upper surface of the acoustic transducer. In some embodiments, the first elastic element 14321 and the second elastic element 14322 may be approximately symmetrically distributed with respect to the mass element 1431 in a first direction. In some embodiments, the first elastic element 14321 may be located on one side of the mass element 1431 away from the substrate structure 1420, a lower surface of the first elastic element 14321 may be connected to an upper surface of the mass element 1431, and an upper surface of the first elastic element 9321 may be connected to an inner wall of the housing structure 1410. In some embodiments, the second elastic element 14322 may be located on one side of the mass element 1431 facing the substrate structure 1420, an upper surface of the second elastic element 14322 may be connected to a lower surface of the mass element 1431, and a lower surface of the second elastic element 14322 may be connected to the substrate structure 1420 on the upper surface of the acoustic transducer. In some embodiments, a peripheral side of the elastic elements 1432 (the first elastic element 14321 and the second elastic element 14322) and a peripheral side of the mass element 1431 may be aligned. For example, a distance between the peripheral sides of the elastic elements 1432 and a sidewall of the housing structure 1410 may be equal to a distance between the peripheral side of the mass element 1431 and the sidewall of the housing structure 1410. In some embodiments, the peripheral sides of the elastic elements 1432 (the first elastic element 14321 and the second elastic element 14322) and the peripheral side of the mass element 1431 may also be staggered (i.e., not aligned). For example, the distance between the peripheral sides of the elastic elements 1432 and the sidewall of the housing structure 1410 may be larger (or less) than the distance between the peripheral side of the mass element 1431 and the sidewall of the housing structure 1410. It should be noted that columnar structures of the first elastic element 14321 and the second elastic element 14322 are regular structures (e.g., cylinders, square columns, etc.) or irregular structures, and shapes of the first elastic element 14321 and the second elastic element 14322 are adaptively adjusted according to a cross-sectional shape of the housing structure 1410. In some embodiments, the peripheral side of one elastic element of the elastic elements 1432 may be aligned with the peripheral side of the mass element 1431, and the peripheral side of another elastic element of the elastic elements 1432 may not be aligned with the peripheral side of the mass element 1431, so that the first elastic element 14321 and the second elastic element 14322 is not asymmetrically distributed in the first direction with respect to the mass element 1431.

In some embodiments, when the first elastic element 14321 and the second elastic element 14322 are the columnar structures with the hollow region in the middle portion, a thickness of the mass element 1431 may be within a range of 10 μm to 1000 μm. In some embodiments, the thickness of the mass element 1431 may be within a range of 4 μm to 500 μm. In some embodiments, the thickness of the mass element 1431 may be within a range of 600 μm to 1400 μm. In some embodiments, thicknesses of the first elastic element 14321 and the second elastic element 14322 may be within a range of 10 μm to 1000 μm. In some embodiments, the thicknesses of the first elastic element 14321 and the second elastic element 14322 may be within a range of 4 μm to 500 μm. In some embodiments, the thickness of the first elastic element 14321 and the second elastic element 14322 may be within a range of 600 μm to 1400 μm. In some embodiments, a difference between the thickness of each elastic element (e.g., the first elastic element 14321 and the second elastic element 14322) of the elastic elements 1432 and the thickness of the mass element 1431 may be within a range of 0 μm to 500 μm. In some embodiments, the difference between the thickness of each elastic element of the elastic elements 1432 and the thickness of the mass element 1431 may be within a range of 20 μm to 400 μm. In some embodiments, the difference between the thickness of each elastic element of the elastic elements 1432 and the thickness of the mass element 1431 may be within a range of 50 μm to 200 μm. In some embodiments, a ratio of the thickness of each elastic element of the elastic elements 1432 to the thickness of the mass element 1431 may be within a range of 0.01 to 100. In some embodiments, the ratio of the thickness of each elastic element of the elastic elements 1432 to the thickness of the mass element 1431 may be within a range of 0.5 to 80. In some embodiments, the ratio of the thickness of each elastic element of the elastic elements 1432 to the thickness of the mass element 1431 may be within a range of 1 to 40. In some embodiments, a gap 1460 may be disposed between an outer side of the first elastic element 14321, an outer side of the second elastic element 14322, an outer side of the mass element 1431, and the housing structure 1410 or the acoustic transducer corresponding to the acoustic cavity. As shown in FIG. 14A, in some embodiments, the gap 1460 may be located on the peripheral side of the mass element 1431. When the mass element 1431 generates vibrations in response to vibrations of the housing structure 1410, the gap 1460 may prevent the mass element 1431 from colliding with the housing structure 1410 during the vibrations. In some embodiments, the gap 1460 may include a filler. More descriptions regarding the filler may be found in FIG. 9A and relevant descriptions thereof, which are not repeated herein.

Figure 14B:
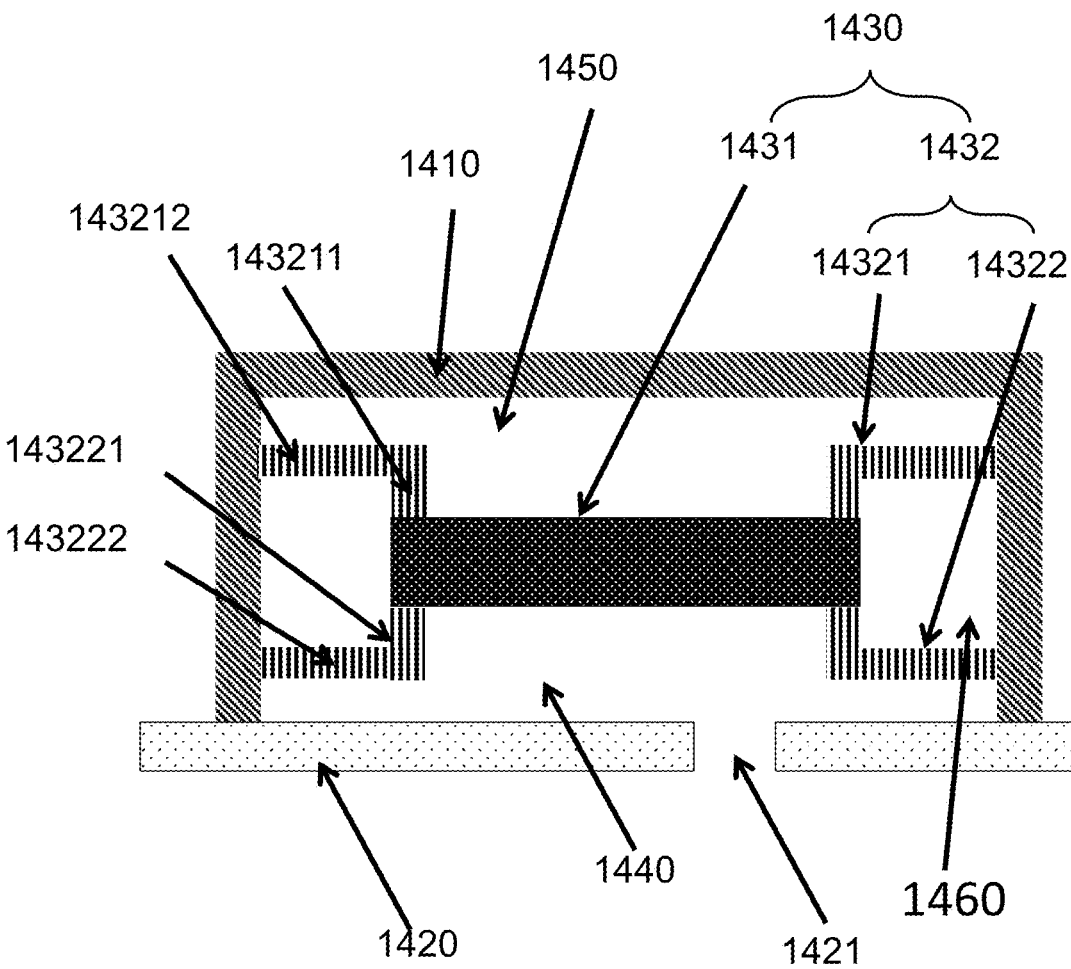
FIG. 14B is a schematic diagram illustrating a structure of a vibration sensor according to some embodiments of the present disclosure.
Figure 14B:
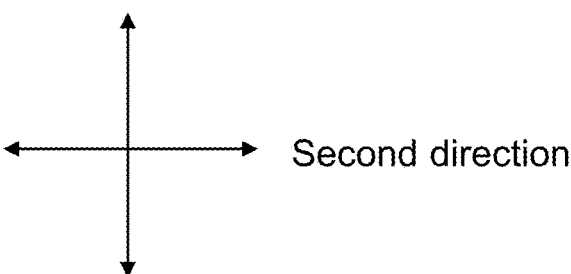
Figure 14C:
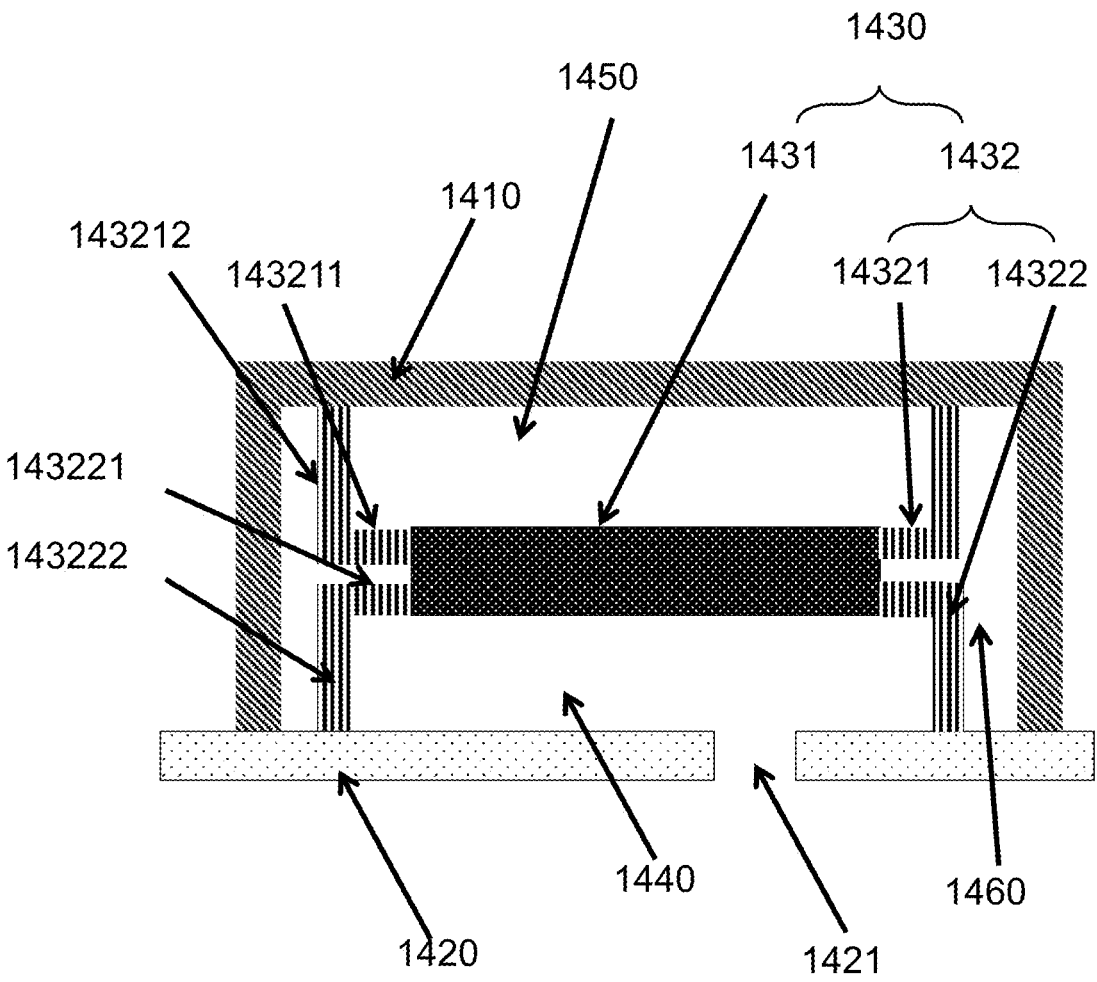
FIG. 14C is a schematic diagram illustrating a structure of a vibration sensor according to some embodiments of the present disclosure.
Figure 14C:
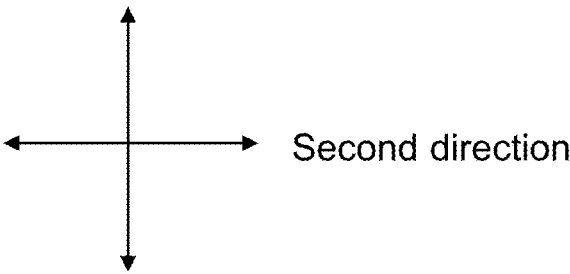

FIG. 14B is a schematic diagram illustrating a structure of a vibration sensor according to some embodiments of the present disclosure. FIG. 14C is a schematic diagram illustrating a structure of a vibration sensor according to some embodiments of the present disclosure. In some embodiments, when the first elastic element 14321 and the second elastic element 14322 are the columnar structures with the hollow region in the middle portion, the columnar structures may be straight columnar structures (as shown in FIG. 14A). The straight columnar structure refers to that the columnar structure does not bend in an extension direction (i.e., a height direction of the columnar structure) of the columnar structure. In some embodiments, the first elastic element 14321 and the second elastic element 14322 may also be structures with bent portions, and extension directions of the bent portions may form a preset angle (e.g., 90°) with the extension directions of the columnar structures.

Referring to a vibration sensor 1400B shown in FIG. 14B, the first elastic element 14321 may include a first columnar portion 143211 and a first bent portion 143212. The first columnar portion 143211 and the first bent portion 143212 may be connected in a bent manner. The bent connection refers to that an extension direction of the first columnar portion 143211 is connected to an extension direction of the first bent portion 143212 at a preset angle. For example, in FIG. 14B, the extension direction of the first columnar portion 143211 may be perpendicular to the extension direction of the first bent portion 143212. For instance, the extension direction of the first columnar portion 143211 may be substantially consistent with the first direction. One end of the first columnar portion 143211 may be connected to an upper surface of the mass element 1431, and another end of the first columnar portion 143211 may be connected to the first bent portion 143212 in a bent manner. The first bent portion 143212 may extend in a second direction and may be connected to a sidewall of the housing structure 1410. Similarly, the second elastic element 14322 may include a second columnar portion 143221 and a second bent portion 143222. The second columnar portion 143221 and the second bent portion 143222 may be connected in a bent manner. One end of the second columnar portion 143221 may be connected to a lower surface of the mass element 1431, and another end of the second columnar portion 143221 may be connected to the second bent portion 143222 in a bent manner. The second bent portion 143222 may extend in the second direction and may be connected to the sidewall of the housing structure 1410. In some embodiments, the peripheral sides of the columnar portions (e.g., the first columnar portion 143211 and the second columnar portion 143221) and the peripheral side of the mass element 1431 may coincide (as shown in FIG. 14B) or may not coincide.

In some embodiments, referring to a vibration sensor 1400C shown in FIG. 14C, the extension direction of the first columnar portion 143211 of the first elastic element 14321 may be substantially consistent with the second direction, one end of the first columnar portion 143211 may be connected to the peripheral side of the mass element 1431, and another end of the first columnar portion 143211 may be connected to the first bent portion 143212 in a bent manner. The first bent portion 143212 may extend in the first direction and may be connected to the housing structure 1410. Similarly, one end of the second columnar portion 143221 of the second elastic element 14322 may be connected to the peripheral side of the mass element 1431, and another end of the second columnar portion 143221 may be connected to the second bent portion 143222 in a bent manner. The second bent portion 143222 may extend in the first direction and may be connected to the substrate structure 1420.

In such setting of FIG. 14B and FIG. 14C, by adjusting the structure of the elastic element 1432 and its connection position with the mass element 1431, a volume of the first acoustic cavity 1440 may be further increased on the premise of ensuring that a centroid of the elastic element 1432 coincides or approximately coincides with a center of gravity of the mass element 1431, thereby improving a response sensitivity of the vibration sensor 1400. In some embodiments, the extension directions of the columnar structures (e.g., the first columnar portion 143211 and the second columnar portion 143221) may not be consistent with the first direction (or the second direction). In some embodiments, the volume of the acoustic cavity may be adjusted by adjusting an angle between the extension directions of the columnar structures and the first direction (or the second direction). In some embodiments, the preset angle formed between the extension directions of the columnar portions and the extension directions of the bent portions may not be limited to 90 degrees, and may also be other suitable angles. For example, in some embodiments, the preset angle formed between the extension directions of the columnar portions and the extension directions of the bent portions may be within a range of 45° to 135°. As another example, the preset angle formed between the extension directions of the columnar portions and the extension directions of the bent portions may be within a range of 60° to 120°. As still another example, the preset angle formed between the extension directions of the columnar portions and the extension directions of the bent portions may be within a range of 80° to 100°.

FIG. 15 is a schematic diagram illustrating a structure of a vibration sensor according to some embodiments of the present disclosure. As shown in FIG. 15, a vibration sensor 1500 may include a housing structure 1510, an acoustic transducer, and a vibration unit 1530. The vibration sensor 1500 shown in FIG. 15 may be the same as or similar to the vibration sensor 900A shown in FIG. 9A. For example, the housing structure 1510 of the vibration sensor 1500 may be the same as or similar to the housing structure 910 of the vibration sensor 900A. As another example, a first acoustic cavity 1540 of the vibration sensor 1500 may be the same as or similar to the first acoustic cavity 940 of the vibration sensor 900A. As still another example, a substrate structure 1520 of the vibration sensor 1500 may be the same as or similar to the substrate structure 920 of the vibration sensor 900A. More descriptions regarding more structures (e.g., a second acoustic cavity 1550, a through hole 1521, a mass element 1531, etc.) of the vibration sensor 1500 may be found in FIG. 9A and the relevant descriptions thereof.

In some embodiments, differences from the vibration sensor 900A may include that a first elastic element 15321 of the vibration sensor 1500 can include a first sub-elastic element 153211 and a second sub-elastic element 153212. The first sub-elastic element 153211 may be connected to the housing structure 1510 corresponding to an acoustic cavity through the second sub-elastic element 153212. The first sub-elastic element 153211 may be connected to an upper surface of the mass element 1531. As shown in FIG. 15, the upper surface of the mass element 1531 may be connected to a lower surface of the first sub-elastic element 153211, an upper surface of the first sub-elastic element 153211 may be connected to a lower surface of the second sub-elastic element 153212, and an upper surface of the second sub-elastic element 153212 may be connected to an inner wall of the housing structure 1510. In some embodiments, a peripheral side of the first sub-elastic element 153211 and a peripheral side of the second sub-elastic element 153212 may coincide or approximately coincide. In some embodiments, the second elastic element 15322 of the vibration sensor 1500 may include a third sub-elastic element 153221 and a fourth sub-elastic element 153222. The third sub-elastic element 153221 may be connected to the acoustic transducer corresponding to the acoustic cavity through the fourth sub-elastic element 153222. The third sub-elastic element 153221 may be connected to a lower surface of the mass element 1531. As shown in FIG. 15, the lower surface of the mass element 1531 may be connected to an upper surface of the third sub-elastic element 153221, a lower surface of the third sub-elastic element 153221 may be connected to an upper surface of the fourth sub-elastic element 153222, and a lower surface of the fourth sub-elastic element 153222 may be connected to the acoustic transducer through the substrate structure 1520 on an upper surface of the acoustic transducer. In some embodiments, a peripheral side of the third sub-elastic element 153221 and a peripheral side of the fourth sub-elastic element 153222 may coincide or approximately coincide.

In some embodiments, the peripheral side of the first sub-elastic element 153211 and the peripheral side of the second sub-elastic element 153212 (or the peripheral side of the third sub-elastic element 153221 and the peripheral side of the fourth sub-elastic element 153222) may not coincide. For example, when the first sub-elastic element 153211 is a film structure and the second sub-elastic element 153212 is a columnar structure, the peripheral side of the first sub-elastic element 153211 may be connected to the inner wall of the housing structure 1510, and a gap may be disposed between the peripheral side of the second sub-elastic element 153212 and the inner wall of the housing structure 1510.

In some embodiments, the first sub-elastic element 153211 and the third sub-elastic element 153221 may be approximately symmetrically distributed in a first direction with respect to the mass element 1531. Sizes, shapes, materials, or thicknesses of the first sub-elastic element 153211 and the third sub-elastic element 153221 may be the same. In some embodiments, the second sub-elastic elements 153212 and the fourth sub-elastic elements 153222 may be approximately symmetrically distributed in the first direction with respect to the mass element 1531. Sizes, shapes, materials, or thicknesses of the second sub-elastic element 153212 and the fourth sub-elastic element 153222 may be the same. In some embodiments, the sizes, the shapes, the materials, or the thicknesses of the first sub-elastic element 153211 and the second sub-elastic element 153212 (or the third sub-elastic element 153221 and the fourth sub-elastic element 153222) may be the same. For example, the materials of the first sub-elastic element 153211 and the second sub-elastic element 153212 may be polytetrafluoroethylene. In some embodiments, the sizes, the shapes, the materials, or the thicknesses of the first sub-elastic element 153211 and the second sub-elastic element 153212 (or the third sub-elastic element 153221 and the fourth sub-elastic element 153222) may be different. For example, the first sub-elastic element 153211 may be the film structure, and the second sub-elastic element 153212 may be the columnar structure.

In some embodiments, the vibration sensor 1500 may further include a fixing piece 1570. The fixing piece 1570 may be distributed along the peripheral side of the mass element 1531. The fixing piece 1570 may be located between the first sub-elastic element 153211 and the third sub-elastic element 153221, and an upper surface and a lower surface of the fixing piece 1570 may be connected to the first sub-elastic element 153211 and the third sub-elastic element 153221, respectively. In some embodiments, the fixing piece 1570 may be a separate structure. For example, the fixing piece 1570 may be a columnar structure with approximately a same thickness as the mass element 1531. The upper surface of the fixing piece 1570 may be connected to the lower surface of the first sub-elastic element 153211, and the lower surface of the fixing piece 1570 may be connected to the upper surface of the third sub-elastic element 153221. In some embodiments, the fixing piece 1570 may also be integrally formed with another structure. For example, the fixing piece 1570 may be a columnar structure integrally formed with the first sub-elastic element 153211 or the third sub-elastic element 153221. In some embodiments, the fixing piece 1570 may also be a columnar structure penetrating through the first sub-elastic element 153211 or the third sub-elastic element 153221. For example, the fixing piece 1570 may penetrate through the first sub-elastic element 153211 to be connected to the second sub-elastic element 153212. In some embodiments, the structure of the fixing piece 1570 may be other types of structures besides the columnar structure, for example, a ring structure, etc. In some embodiments, when the fixing piece 1570 is the ring structure, the fixing piece 1570 may be uniformly distributed on the peripheral side of the mass element 1531. The upper surface of the fixing piece 1570 may be connected to the lower surface of the first sub-elastic element 153211, and the lower surface of the fixing piece 1570 may be connected to the upper surface of the third sub-elastic element 153221.

In some embodiments, a thickness of the fixing piece 1570 may be the same as a thickness of the mass element 1531. In some embodiments, the thickness of the fixing piece 1570 may be different from the thickness of the mass element 1531. For example, the thickness of the fixing piece 1570 may be larger than the thickness of the mass element 1531. In some embodiments, a material of the fixing piece 1570 may be an elastic material, such as foam, plastic, rubber, silicone, etc. In some embodiments, the material of the fixing piece 1570 may also be a rigid material, such as metal, a metal alloy, etc. In some embodiments, the material of the fixing piece 1570 may be the same as a material of the mass element 1531. In some embodiments, the fixing piece 1570 may realize a fixing function of a gap 1560. The fixing piece 1570 may also be used as an additional mass element, which adjusts a resonant frequency of the vibration sensor, thereby adjusting (e.g., reducing) a difference between the sensitivity of the vibration sensor in a second direction and a sensitivity of the vibration sensor in the first direction.

In some embodiments, the gap 1560 may be disposed between the fixing piece 1570, the mass element 1531, the first sub-elastic element 153211, and the second sub-elastic element 153212. In some embodiments, the gap 1560 may also be disposed between the peripheral side of the elastic element 1532, the peripheral side of the fixing piece 1570, the inner wall of the housing structure 1510, and the acoustic transducer. In some embodiments, when the mass element 1531 generates vibrations in response to vibrations of housing structure 1510, the gap 1560 may prevent the mass element 1531 from colliding with the housing structure 1510 during the vibrations. In some embodiments, the gap 1560 may include a filler. More descriptions regarding the filler may be found in FIG. 9A and the relevant descriptions thereof, which are not repeated herein.

Figure 16:
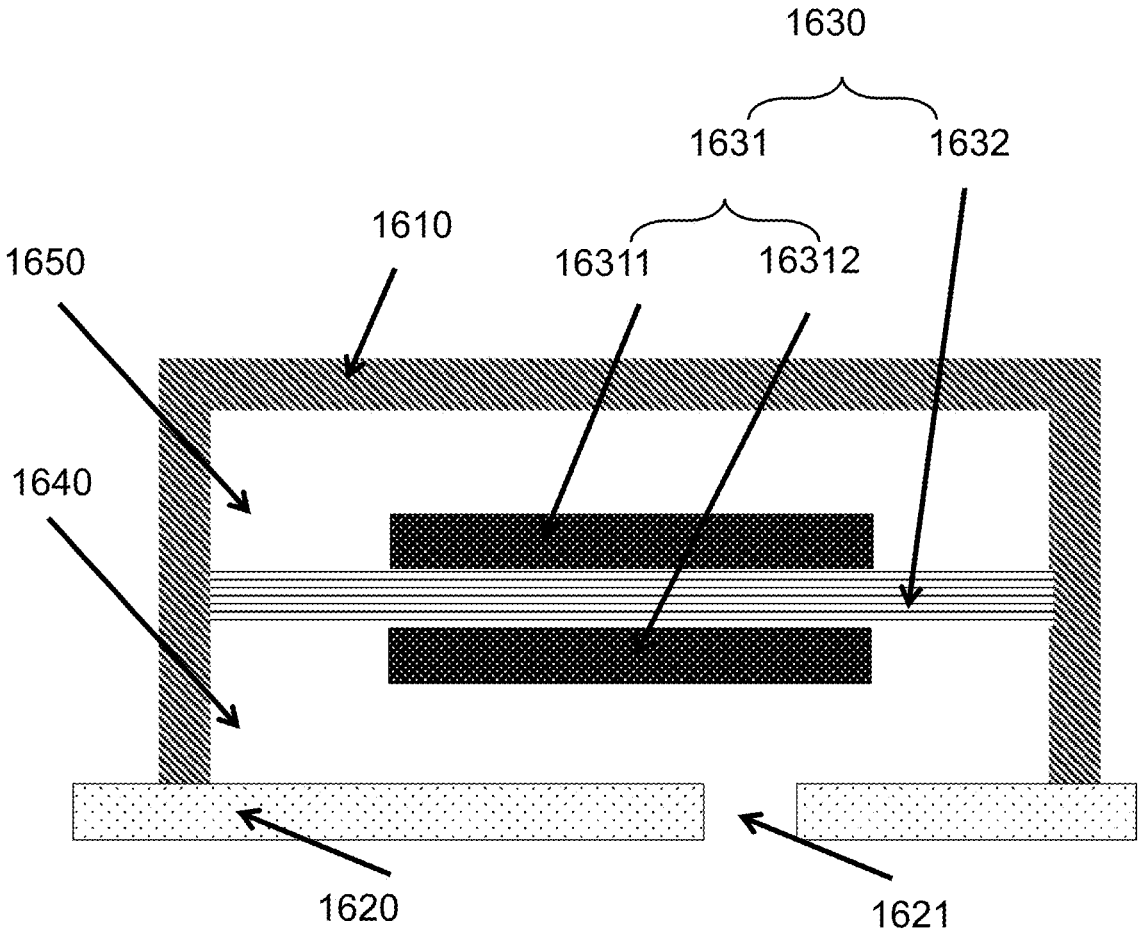
FIG. 16 is a schematic diagram illustrating a structure of a vibration sensor according to some embodiments of the present disclosure.
Figure 16:
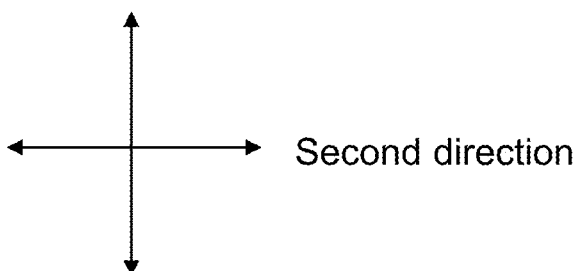

FIG. 16 is a schematic diagram illustrating a structure of a vibration sensor according to some embodiments of the present disclosure. As shown in FIG. 16, a vibration sensor 1600 may include a housing structure 1610, an acoustic transducer, and a vibration unit 1630. The vibration sensor 1600 shown in FIG. 16 may be the same as or similar to the vibration sensor 900A shown in FIG. 9A. For example, a housing structure 1610 of the vibration sensor 1600 may be the same as or similar to the housing structure 910 of the vibration sensor 900A. As another example, a first acoustic cavity 1640 of the vibration sensor 1600 may be the same as or similar to the first acoustic cavity 940 of the vibration sensor 900A. As still another example, a substrate structure 1620 of the vibration sensor 1600 may be the same as or similar to the substrate structure 920 of the vibration sensor 900A. More descriptions regarding more structures (e.g., a second acoustic cavity 1650, a through hole 1621, an acoustic transducer, etc.) of the vibration sensor 1600 may be found in FIG. 9A and the relevant descriptions thereof.

In some embodiments, the difference between the vibration sensor 1600 and the vibration sensor 900A may include that structures of the vibration units are different. The vibration unit 1630 of the vibration sensor 1600 may include an elastic element 1632 and two mass elements (e.g., a first mass member 16311 and a second mass member 16312). In some embodiments, mass elements 1631 may include the first mass element 16311 and the second mass element 16312. The first mass element 16311 and the second mass element 16312 may be symmetrically disposed in a first direction with respect to the elastic element 1632. In some embodiments, the first mass element 16311 may be located on one side of the elastic element 1632 away from the substrate structure 1620, and a lower surface of the first mass element 16311 may be connected to an upper surface of the elastic element 1632. The second mass element 16312 may be located on one side of the elastic element 1632 facing the substrate structure 1620, and an upper surface of the second mass element 16312 may be connected to a lower surface of the elastic element 1632. In some embodiments, sizes, shapes, materials, or thicknesses of the first mass element 16311 and the second mass element 16312 may be the same. In some embodiments, the first mass element 16311 and the second mass element 16312 may be symmetrically disposed in the first direction with respect to the elastic element 1632, so that centers of gravity of the mass elements 1631 approximately coincide with a centroid of the elastic element 1632. Therefore, when the vibration unit 1630 generates vibrations in response to vibrations of the housing structure 1610, the vibrations of the mass elements 1631 in a second direction may be reduced, thereby reducing a response sensitivity of the vibration unit 1630 to the vibrations of the housing structure 1610 in the second direction, and improving a direction selectivity of the vibration sensor 1600.

In some embodiments, the first mass element 16311 and the second mass element 16312 may be distributed on two opposite sides of the elastic element 1632 in the first direction. The first mass element 16311 and the second mass element 16312 may be approximately regarded as an integrated mass element. A center of gravity of the integrated mass element may approximately coincide with a centroid of the at least one elastic element 1632, so that the response sensitivity of the vibration unit 1630 to the vibrations of the housing structure 1610 in the first direction is higher than the response sensitivity of the vibration unit 1630 to the vibrations of the housing structure 1610 in the second direction within a target frequency range (e.g., below 3000 Hz). In some embodiments, a difference between the response sensitivity of the vibration unit 1630 to the vibrations of the housing structure 1610 in the second direction and the response sensitivity of the vibration unit 1630 to the vibrations of the housing structure 1610 in the first direction may be within a range of –20 dB to –60 dB. In some embodiments, the difference between the response sensitivity of the vibration unit 1630 to the vibrations of the housing structure 1610 in the second direction and the response sensitivity of the vibration unit 1630 to the vibrations of the housing structure 1610 in the first direction may be within a range of –25 dB to –50 dB. In some embodiments, the difference between the response sensitivity of the vibration unit 1630 to the vibrations of the housing structure 1610 in the second direction and the response sensitivity of the vibration unit 1630 to the vibrations of the housing structure 1610 in the first direction may be within a range of –30 dB to –40 dB.

In some embodiments, during a working process of the vibration sensor 1600, the response sensitivity of the vibration unit 1630 to the vibrations of the housing structure 1610 in the second direction may be reduced by reducing the vibrations generated by the vibration unit 1630 in the second direction, thereby improving a direction selectivity of the vibration sensor 1600, and reducing the interference of a noise signal to a sound signal.

In some embodiments, the centroid of the elastic element 1632 may coincide or approximately coincide with the centers of gravity of the mass elements 1631. In some embodiments, when the vibration unit 1630 generates the vibrations in response to the vibrations of the housing structure 1610, the centroid of the elastic element 1632 may coincide with or approximately coincides with the centers of gravity of the mass elements 1631, and the vibrations of the mass elements 1631 in the second direction may be reduced on the premise that the response sensitivity of the vibration unit 1630 to the vibrations of the housing structure 1610 in the first direction is substantially constant, thereby reducing the response sensitivity of the vibration unit 1630 to the vibrations of the housing structure 1610 in the second direction, and improving the direction selectivity of the vibration sensor 1600. In some embodiments, the response sensitivity of the vibration unit 1630 to the vibrations of the housing structure 1610 in the first direction may be changed (e.g., improved) by adjusting the thickness and an elastic coefficient of the elastic element 1632, masses and sizes of the mass elements 1631, etc.

In some embodiments, a distance between the centroid of the elastic element 1632 and the centers of gravity of the mass elements 1631 in the first direction may not be larger than ⅓ of the thicknesses of the mass elements 1631. In some embodiments, the distance between the centroid of the elastic element 1632 and the centers of gravity of the mass elements 1631 in the first direction may not be larger than ½ of the thicknesses of the mass elements 1631. In some embodiments, the distance between the centroid of the elastic element 1632 and the centers of gravity of the mass elements 1631 in the first direction may not be larger than ¼ of the thicknesses of the mass elements 1631. In some embodiments, the distance between the centroid of the elastic element 1632 and the centers of gravity of the mass elements 1631 in the second direction may not be larger than ⅓ of side lengths or radii of the mass elements 1631. In some embodiments, the distance between the centroid of the elastic element 1632 and the centers of gravity of the mass elements 1631 in the second direction may not be larger than ½ of the side lengths or the radii of the mass element 1631.

In some embodiments, the distance between the centroid of the elastic element 1632 and the centers of gravity of the mass element 1631 in the second direction may not be larger than ¼ of the side lengths or the radii of the mass element 1631. For example, when the mass elements 1631 are cubes, the distance between the centroid of the elastic element 1632 and the centers of gravity of the mass elements 1631 in the second direction may not be larger than ⅓ of the side lengths of the mass elements 1631. As another example, when the mass elements 1631 are cylinders, the distance between the centroid of the elastic element 1632 and the centers of gravity of the mass elements 1631 in the second direction may not be larger than ⅓ of the radii of the upper surfaces (or the lower surfaces) of the mass elements 1631.

In some embodiments, when the centroid of the elastic element 1632 coincides or approximately coincides with the centers of gravity of the mass elements 1631, a resonant frequency of the vibrations of the vibration unit 1630 in the second direction may shift to a high frequency without changing the resonant frequency of the vibrations of the vibration unit 1630 in the first direction. In some embodiments, when the centroid of the elastic element 1632 coincides or approximately coincides with the centers of gravity of the mass elements 1631, the resonant frequency of the vibrations of the vibration unit 1630 in the first direction may remain substantially constant. For example, the resonant frequency of the vibrations of the vibration unit 1630 in the first direction may be a frequency within a relatively strong frequency range (e.g., from 20 Hz to 2000 Hz, from 2000 Hz to 3000 Hz, etc.) that is perceived by human ears. The resonant frequency of the vibrations of the vibration unit 1630 in the second direction may shift to a high frequency to be located within a relatively weak frequency range (e.g., from 5000 Hz to 9000 Hz, from 1 kHz to 14 kHz, etc.) that is perceived by the human ears. As the resonant frequency of the vibrations of the vibration unit 1630 in the second direction shifts to the high frequency, and the resonant frequency of the vibration unit 1630 in the first direction remains substantially constant, a ratio of the resonant frequency of the vibrations of the vibration unit 1630 in the second direction to the resonant frequency of the vibrations of the vibration unit 1630 in the first direction may be larger than or equal to 2. In some embodiments, the ratio of the resonant frequency of the vibrations of the vibration unit 1630 in the second direction to the resonant frequency of the vibrations of the vibration unit 1630 in the first direction may also be larger than or equal to other values. For example, the ratio of the resonant frequency of the vibrations of the vibration unit 1630 in the second direction to the resonant frequency of the vibrations of the vibration unit 1630 in the first direction may also be larger than or equal to 1.5.

Figure 17:
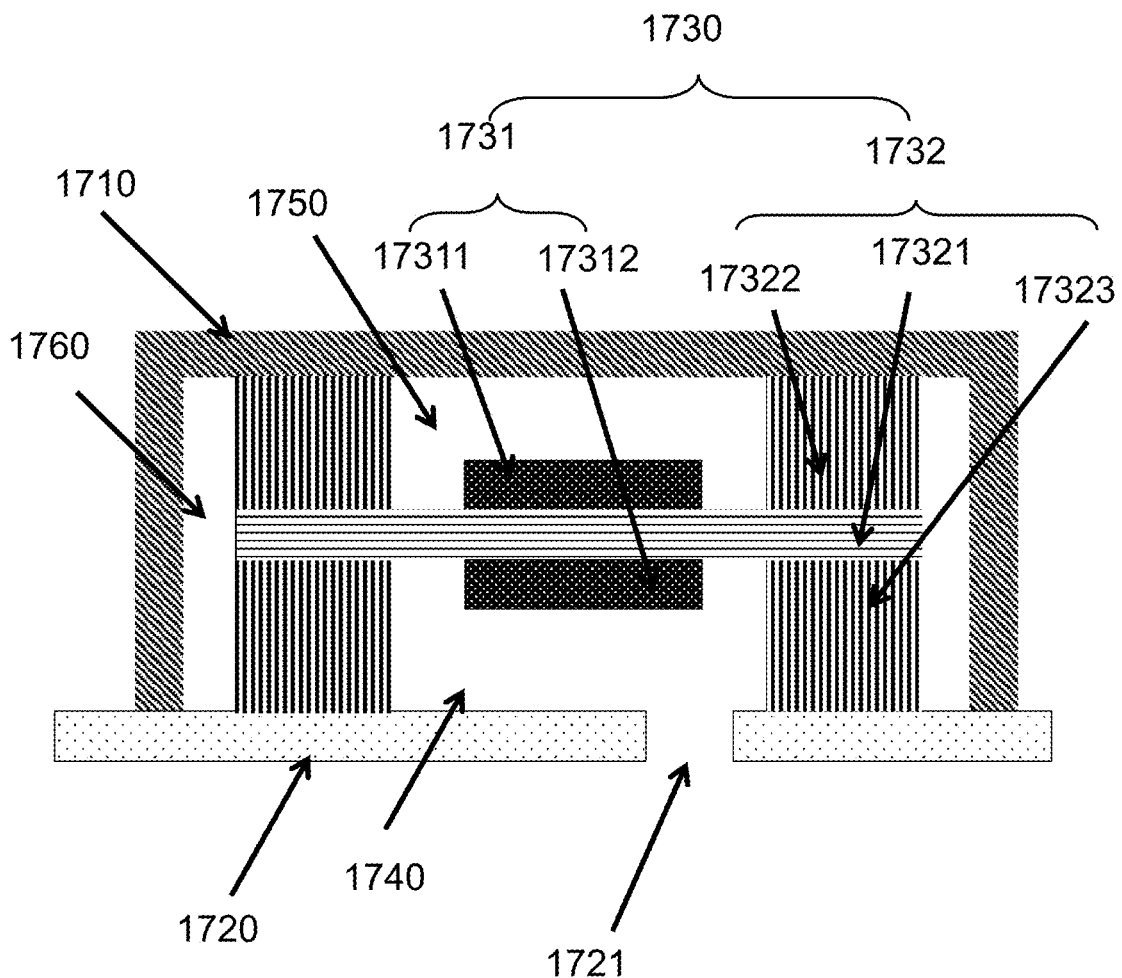
FIG. 17 is a schematic diagram illustrating a structure of a vibration sensor according to some embodiments of the present disclosure.
Figure 17:
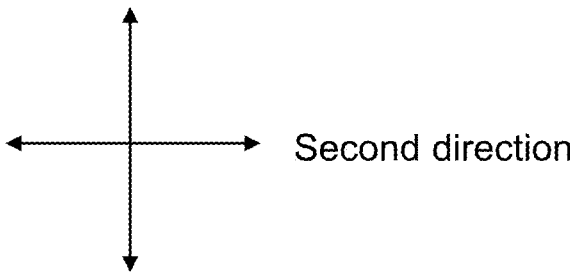

FIG. 17 is a schematic diagram illustrating a structure of a vibration sensor according to some embodiments of the present disclosure. As shown in FIG. 17, a vibration sensor 1700 may include a housing structure 1710, an acoustic transducer, and a vibration unit 1730. The vibration sensor 1700 shown in FIG. 17 may be the same as or similar to the vibration sensor 1600 shown in FIG. 16. For example, the housing structure 1710 of the vibration sensor 1700 may be the same as or similar to the housing structure 1610 of the vibration sensor 1600. As another example, a first acoustic cavity 1740 of the vibration sensor 1700 may be the same as or similar to the first acoustic cavity 1640 of the vibration sensor 1600. As still another example, the acoustic transducer of the vibration sensor 1700 may be the same as or similar to the acoustic transducer of the vibration sensor 1600. More descriptions regarding more structures (e.g., a second acoustic cavity 1750, a through hole 1721, mass elements 1731, a first mass element 17311, a second mass element 17312, etc.) of the vibration sensor 1700 may be found in FIG. 16 and the relevant descriptions thereof.

Differences from the vibration sensor 1600 may include that elastic elements 1732 of the vibration sensor 1700 can further include a second elastic element 17322 and a third elastic element 17323. In some embodiments, a first elastic element 17321 may be connected to the housing structure 1710 and/or the acoustic transducer through the second elastic element 17322 and the third elastic element 17323, respectively. As shown in FIG. 17, the first elastic element 17321 may be a film structure, and the second elastic element 17322 and the third elastic element 17323 may be columnar structures. An upper surface of the first elastic element 17321 may be connected to a lower surface of the second elastic element 17322, and an upper surface of the second elastic element 17322 may be connected to an inner wall of the housing structure 1710. A lower surface of the first elastic element 17321 may be connected to an upper surface of the third elastic element 17323, and a lower surface of the third elastic element 17323 may be connected to the acoustic transducer through the substrate structure 1720 on an upper surface of the acoustic transducer. In some embodiments, peripheral sides of the first elastic element 17321, the second elastic element 17322 and the third elastic element 17323 may coincide or approximately coincide. In some embodiments, the peripheral sides of the first elastic element 17321, the second elastic element 17322 and the third elastic element 17323 may not coincide. For example, when the first elastic element 17321 is the film structure, and the second elastic element 17322 and the third elastic element 17323 are the columnar structures, the peripheral side of the first elastic element 17321 may be connected to the inner wall of the housing structure 1710. A gap may be disposed between the peripheral sides of the second elastic element 17322 and the third elastic element 17323 and the inner wall of the housing structure 1710.

In some embodiments, structures of the first elastic element 17321, the second elastic element 17322, and the third elastic element 17323 may also be the same. For example, the first elastic element 17321, the second elastic element 17322, and the third elastic element 17323 may be the film structures. In some embodiments, materials of the first elastic element 17321, the second elastic element 17322, and the third elastic element 17323 may be the same. In some embodiments, the materials of the first elastic element 17321, the second elastic element 17322 and the third elastic element 17323 may be different.

In some embodiments, a gap 1760 may be disposed between an outer side of the first elastic element 17321, an outer side of the second elastic element 17322, an outer side of the third elastic element 17323, and the housing structure 1710 or the acoustic transducer corresponding to an acoustic cavity. In some embodiments, when the mass elements 1731 generate vibrations in response to vibrations of the housing structure 1710, the gap 1760 may prevent the mass elements 1731 from colliding with the housing structure 1710 during the vibrations. In some embodiments, the gap 1760 may include a filler. More descriptions regarding the filler may be found in FIG. 9A and the relevant descriptions thereof, which are not repeated herein.

In some embodiments, when there are two mass elements (e.g., the mass element 1631 shown in FIG. 16, the mass element 1731 shown in FIG. 17), each mass element may include a plurality of sub-mass elements arranged in an array. The plurality of sub-mass elements may be arranged in an array on surfaces of the elastic elements. For example, the first mass element 17311 may include a plurality of first sub-mass elements arranged in an array at a center position of an upper surface of the elastic elements, and the second mass element 17312 may include a plurality of second sub-mass elements arranged in an array at a center position of a lower surface of the elastic elements. In some embodiments, the plurality of first sub-mass elements and the plurality of second sub-mass elements may be symmetrically arranged in a first direction with respect to the elastic elements. In some embodiments, a centroid of the mass elements may be a midpoint of a connecting line between a geometric center of an array shape formed by the plurality of first sub-mass elements and a geometric center of an array shape formed by the plurality of second sub-mass elements. The centroid of the mass elements may be related to shape structures and sizes of the array shapes formed by the plurality of first sub-mass elements and the plurality of second sub-mass elements. For example, when the array shape is a rectangular plate structure, the centroid of the first mass element 17311 may be located at an intersection of two diagonal lines of a rectangular plate structure corresponding to the first mass element 17311, and the centroid of the second mass element may also be located at an intersection of two diagonal lines of a rectangular plate structure corresponding to the second mass element 17312. The centroid of the integrated mass element may be a midpoint of a connecting line of the two intersections. In some embodiments, the integrated mass element may be approximately regarded as a structure with a uniform density. At this time, the centroid of the mass elements may be approximately regarded as the center of gravity of the mass elements.

It should be noted that the vibration unit (e.g., the vibration unit 830 shown in FIG. 8, the vibration unit 930 shown in FIGS. 9A-9C, unit 1430, the vibration unit 1430 shown in FIGS. 14A-14C, etc.) of the vibration sensor shown in the embodiments of the present disclosure may be transversely set. In some embodiments, a set direction of the vibration unit may also be in other directions (e.g., vertically or obliquely set). Correspondingly, the first direction and the second direction may change with the mass element (e.g., the mass element 831 shown in FIG. 8, the mass element 931 shown in FIGS. 9A-9C, the mass element 1431 shown in FIGS. 14A-14C, etc.). For example, when the vibration unit 830 (the mass element 831) of the vibration sensor 800 is vertically set, it can be approximately considered that the whole of the vibration unit 830 shown in FIG. 8 may rotate 90° along a clockwise (or counterclockwise) direction. Correspondingly, the first direction and the second direction may also change with the rotation of the vibration unit 830. The working principle of the vibration sensor when the vibration unit is vertically set may be similar to the working principle of the vibration sensor when the vibration unit is transversely set, which is not repeated herein.

The basic concept has been described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, those skilled in the art will understand that various aspects of the present disclosure can be illustrated and described by several patentable categories or situations, including any combination of new and useful processes, machines, products, or substances, or any new and useful improvements on them. Correspondingly, various aspects of the present disclosure may be entirely executed by hardware, may be entirely executed by software (including firmware, resident software, microcode, etc.), or may be executed by a combination of hardware and software. The above hardware or softwares can be referred to as "data block," "module," "engine," "unit," "component," or "system." Additionally, aspects of the present disclosure may be embodied as a computer product comprising computer readable program codes on one or more computer readable media.

The computer storage medium may contain a propagated data signal embodying the computer program codes, for example, in baseband or as part of a carrier wave. The propagated signal may have various manifestations, including electromagnetic form, optical form, or the like, or a suitable combination thereof. The computer storage medium may be any computer-readable medium, other than the computer-readable storage medium, that can be used to communicate, propagate, or transfer a program for use by being coupled to an instruction execution system, apparatus, or device. Program codes residing on the computer storage medium may be transmitted over any suitable medium, including radio, electrical cable, fiber optic cable, RF, or the like, or combinations of any of the foregoing.

The computer program codes required for the operation of each part of the present disclosure can be written in any one or more programming languages, including object-oriented programming languages such as Java, Scala, Smalltalk, Eiffel, JADE, Emerald, C++, C#, VB.NET, Python etc., conventional procedural programming languages such as C language, Visual Basic, Fortran 2003, Perl, COBOL 2002, PHP, ABAP, dynamic programming languages such as Python, Ruby and Groovy, or other programming languages, etc. The program codes may run entirely on the user's computer, or as a stand-alone software package, or run partly on the user's computer and partly on a remote computer, or entirely on the remote computer or server. In the latter case, the remote computer can be connected to the user computer through any form of network, such as a local area network (LAN) or wide area network (WAN), or to an external computer (such as through the Internet), or in a cloud computing environment, or a software as a service (SaaS).

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about," "approximately," or "substantially" in some examples. Unless otherwise stated, "about," "approximately," or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vibration sensor, comprising:
   a housing structure;

an acoustic transducer physically connected to the housing structure, wherein an acoustic cavity is formed at least partially by the housing structure and the acoustic transducer; and a vibration unit configured to divide the acoustic cavity into a plurality of acoustic cavities, the plurality of acoustic cavities including a first acoustic cavity, the first acoustic cavity being in acoustic communication with the acoustic transducer, wherein the vibration unit includes an elastic element and a mass element, the elastic element and the mass element being located in the acoustic cavity, and the mass element being connected to the housing structure or the acoustic transducer through the elastic element;

the housing structure is configured to generate vibrations based on an external vibration signal, the vibration unit causes a volume change of the first acoustic cavity in response to the vibrations of the housing structure, and the acoustic transducer generates an electrical signal based on the volume change of the first acoustic cavity;

the elastic element includes a first elastic element and a second elastic element, the first elastic element and the second elastic element being respectively connected to the mass element and distributed at intervals along a vibration direction of the vibration unit, the vibration direction including a first direction and a second direction, and a ratio of a resonant frequency of vibrations of the vibration unit in the second direction to a resonant frequency of vibrations of the vibration unit in the first direction being larger than or equal to 2.

2. The vibration sensor of claim 1, wherein a response sensitivity of the vibration unit to the vibrations of the housing structure in the first direction is higher than the response sensitivity of the vibration unit to the vibrations of the housing structure in the second direction within a target frequency range, the second direction being perpendicular to the first direction.

3. The vibration sensor of claim 1, wherein a difference between a response sensitivity of the vibration unit to the vibrations of the housing structure in the second direction and a response sensitivity of the vibration unit to the vibrations of the housing structure in the first direction is within a range of −20 dB to 40 dB.

4. The vibration sensor of claim 1, wherein the first direction is a thickness direction of the mass element, and a distance between a centroid of the elastic element and a center of gravity of the mass element in the first direction is not larger than ⅓ of a thickness of the mass element, and a distance between the centroid of the elastic element and the center of gravity of the mass element in the second direction is not larger than ⅓ of a side length or a radius of the mass element.

5. The vibration sensor of claim 1, wherein the first elastic element and the second elastic element are connected to the housing structure or the acoustic transducer corresponding to the acoustic cavity; and the first elastic element and the second elastic element are approximately symmetrically distributed in the first direction with respect to the mass element, wherein the first direction is a thickness direction of the mass element, an upper surface of the mass element is connected to the first elastic element, and a lower surface of the mass element is connected to the second elastic element.

6. The vibration sensor of claim 5, wherein sizes, shapes, materials, and thicknesses of the first elastic element and the second elastic element are the same.

7. The vibration sensor of claim 5, wherein the first elastic element and the second elastic element are film structures, one side of the first elastic element is connected to the upper surface of the mass element, one side of the second elastic element is connected to the lower surface of the mass element, and a size of the upper surface or the lower surface of the mass element is less than sizes of the first elastic element and the second elastic element.

8. The vibration sensor of claim 7, wherein a volume of an acoustic cavity formed between the first elastic element and the housing structure or the acoustic transducer corresponding to the acoustic cavity is larger than or equal to a volume of the first acoustic cavity formed between the second elastic element and the housing structure or the acoustic transducer corresponding to the acoustic cavity.

9. The vibration sensor of claim 7, wherein a gap is arranged between the first elastic element, the second elastic element, the mass element, and the housing or the acoustic transducer corresponding to the acoustic cavity, and the gap has a filler for adjusting a quality factor of the vibration sensor.

10. The vibration sensor of claim 7, wherein a thickness of the mass element is within a range of 10 μm to 1000 μm, and a thickness of each of the first elastic element and the second elastic element is within a range of 0.1 μm to 500 μm.

11. The vibration sensor of claim 5, wherein the first elastic element and the second elastic element are located between a peripheral side of the mass element and the housing structure, and the peripheral side of the mass element is connected to the housing structure through the first elastic element and the second elastic element.

12. The vibration sensor of claim 11, wherein a volume of an acoustic cavity formed between the first elastic element, the mass element, and the housing structure or the acoustic transducer corresponding to the acoustic cavity is larger than or equal to a volume of the first acoustic cavity formed between the second elastic element, the mass element, and the housing structure or the acoustic transducer corresponding to the acoustic cavity.

13. The vibration sensor of claim 5, wherein the first elastic element and the second elastic element are columnar structures, and the first elastic element and the second elastic element respectively extend along the thickness direction of the mass element and are connected to the housing structure or the acoustic transducer.

14. The vibration sensor of claim 13, wherein a gap is arranged between an outer side of the first elastic element, an outer side of the second elastic element, an outer side of the mass element, and the housing structure or the acoustic transducer corresponding to the acoustic cavity, and the gap has a filler for adjusting a quality factor of the vibration sensor.

15. The vibration sensor of claim 5, wherein the first elastic element includes a first sub-elastic element and a second sub-elastic element, the first sub-elastic element being connected to the housing structure or the acoustic transducer corresponding to the acoustic cavity through the second sub-elastic element, and the first sub-elastic element being connected to the upper surface of the mass element; and the second elastic element includes a third sub-elastic element and a fourth sub-elastic element, the third sub-elastic element being connected to the housing structure or the acoustic transducer corresponding to the acoustic cavity through the fourth sub-elastic element, and the third sub-elastic element being connected to the lower surface of the mass element.

16. The vibration sensor of claim 15, wherein a peripheral side of the first sub-elastic element approximately coincides with a peripheral side of the second sub-elastic element, and a peripheral side of the third sub-elastic element approximately coincides with a peripheral side of the fourth sub-elastic element.

17. The vibration sensor of claim 16, wherein the vibration sensor further includes a fixing piece, the fixing piece is distributed along the peripheral side of the mass element, the fixing piece is located between the first sub-elastic element and the third sub-elastic element, and an upper surface and a lower surface of the fixing piece are respectively connected to the first sub-elastic element and the third sub-elastic element.

18. The vibration sensor of claim 17, wherein a gap is arranged between the fixing piece, the mass element, the first sub-elastic element, and the second sub-elastic element, and the gap has a filler for adjusting a quality factor of the vibration sensor.

19. A vibration sensor, comprising:

a housing structure;

an acoustic transducer physically connected to the housing structure, wherein an acoustic cavity is formed at least partially by the housing structure and the acoustic transducer; and a vibration unit configured to divide the acoustic cavity into a plurality of acoustic cavities, the plurality of acoustic cavities including a first acoustic cavity, the first acoustic cavity being in acoustic communication with the acoustic transducer, wherein the vibration unit includes an elastic element and a mass element, the elastic element and the mass element being located in the acoustic cavity, and the mass element being connected to the housing structure or the acoustic transducer through the elastic element;

the housing structure is configured to generate vibrations based on an external vibration signal, the vibration unit causes a volume change of the first acoustic cavity in response to the vibrations of the housing structure, and the acoustic transducer generates an electrical signal based on the volume change of the first acoustic cavity;

the mass element is distributed on two opposite sides of the elastic element in a first direction, wherein a vibration direction of the vibration unit includes a first direction and a second direction, and a ratio of a resonant frequency of vibrations of the vibration unit in the second direction to a resonant frequency of vibrations of the vibration unit in the first direction is larger than or equal to 2.

* * * * *